United States Patent [19]
Renner et al.

[11] Patent Number: 5,214,650
[45] Date of Patent: May 25, 1993

[54] SIMULTANEOUS VOICE AND DATA SYSTEM USING THE EXISTING TWO-WIRE INTER-FACE

[75] Inventors: Robert E. Renner; Kuang-Cheng Hu, both of Phoenix; Han Kem, Glendale; John S. Young, Scottsdale, all of Ariz.

[73] Assignee: AG Communication Systems Corporation, Phoenix, Ariz.

[21] Appl. No.: 615,679

[22] Filed: Nov. 19, 1990

[51] Int. Cl.$^5$ .............................................. H04J 3/12
[52] U.S. Cl. .................................. 370/110.1; 370/24; 370/112; 379/93
[58] Field of Search ................ 370/110.1, 110.2, 110.3, 370/112, 77, 24, 33, 34, 36, 37; 379/93

[56] References Cited

U.S. PATENT DOCUMENTS

| | | | |
|---|---|---|---|
| 4,476,559 | 10/1984 | Brolin et al. | 370/110.1 |
| 4,512,016 | 4/1985 | Fulcomer, Jr. et al. | 370/110.1 |
| 4,512,017 | 4/1985 | Nici et al. | 370/110.1 |
| 4,670,874 | 6/1987 | Sato et al. | 370/110.1 |
| 4,672,662 | 6/1987 | Nishino et al. | 370/110.1 |
| 4,809,271 | 2/1989 | Kondo et al. | 370/110.1 |

Primary Examiner—Douglas W. Olms
Assistant Examiner—Hassan Kizou
Attorney, Agent, or Firm—Anthony J. Baca

[57] ABSTRACT

A data adapter for simultaneously providing a low speed channel, a first high speed data channel, and a second high speed channel over a two wire connection; the two wire connection connects the data adapter to a telephone system. The data adapter includes a line transceiver connected to the two-wire connection, the line interface provides a full duplex transmission link with the telephone system over the two-wire connection. A telephone interface converts data between the first high speed channel and a telephone instrument. A rate adapter converts data between the second high speed channel and a data processing equipment. A protocol controller performs a packet protocol on the low speed channel, and routes the first high speed channel to the telephone interface and the second high speed channel to the rate adapter. A processor that receives and transmits messages through the protocol controller over the low speed channel to the telephone system, and in response to information received over the low speed channel, alternatively information received from the rate adapter, the processor controls the data adapter.

13 Claims, 13 Drawing Sheets

RATE ADAPTION
STATE DIAGRAM

HIGH SPEED MODE

INPUT EVENTS

A. LOCAL CONNECT
REQUEST
B. LOCAL DISCONNECT
REQUEST

SIMULTANEOUS VOICE AND DATA SYSTEM USING THE EXISTING TWO-WIRE INTER-FACE

CROSS-REFERENCE TO RELATED APPLICATIONS

The present application is related to the following co-pending U.S. patent applications all being assigned to the same assignee, entitled:

"A NETWORK INDEPENDENT CLOCKING CIRCUIT WHICH ALLOWS A SYNCHRONOUS MASTER TO BE CONNECTED TO A CIRCUIT SWITCHED DATA ADAPTER", Ser. No. 07/615,524 filed on Nov. 19, 1990;

"A CIRCUIT AND METHOD OF HANDLING ASYNCHRONOUS OVERSPEED", Ser. No. 07/615,525 filed on Nov. 19, 1990;

"A METHOD OF IMPLEMENTING ECMA 102 RATE ADAPTION", Ser. No. 07/615,661 filed on Nov. 19, 1990; and "A METHOD OF IMPLEMENTING ECMA 102 RATE DEADAPTION", Ser. No. 07/617,848 filed on Nov. 19, 1990.

FIELD OF THE INVENTION

The present invention relates in general to telecommunication systems, and more particularly a data adapter which simultaneously provides a voice and high speed data channel over an existing two-wire interface.

BACKGROUND OF THE INVENTION

Prior to the present invention, high speed data could only be provided by special leased lines. Even with these special leased lines, data rates were limited to relatively low baud rates, (i.e. <19.2 Kbaud). Nor did these special leased lines provide voice capacity. It was necessary to bring in tie-lines to achieve the higher data rate and Local Area Networks (LAN) to achieve substantially higher data rates.

A LAN system can provide a very high data rate but requires that each location be connected to a new, special LAN wire. This makes LANs only practical for a small area such as an office building, hence, the name local area networks.

Both tie-lines and leased lines overcome the local restriction but have there own restrictions. Unless the telephone company has spare special lines running between the Central Office (CO) and the location desiring service, new lines must be laid. The laying of new lines is generally an expensive process.

It therefore becomes the object of the present invention to provide an apparatus which simultaneously provides voice and high speed data channels over the existing tip-and-ring two-wire interface.

SUMMARY OF THE INVENTION

In order to accomplish the object of the present invention there is provided a data adapter for simultaneously providing a low speed channel, a first high speed data channel, and a second high speed channel over a two wire connection. The two wire connection connects the data adapter to a telephone system. The data adapter consists of:

A line transceiver connected to the two-wire connection; the line transceiver provides a full duplex transmission link with the telephone system over the two-wire connection. The line transceiver is controlled through a control interface. A telephone instrument transmits and receives information from a telephone interface.

A signal processor that performs a rate adaption and de-adaption protocol program on the second high speed channel and the data from/to the data processing equipment. A serial transceiver connected between the signal processor and the data processing equipment, where the serial transceiver converts data between the signal processor and the data processing equipment. A parallel to serial converter connected to the signal processor, the parallel to serial converter accepts parallel data from the signal processor and converts the parallel data to serial data. A serial transceiver connected between the signal processor and the parallel to serial converter, the serial transceiver receives the serial data and extract a complete data byte from the serial data, the complete data byte is then converted to a parallel format and transmitted to the signal processor.

A protocol controller that performs a packet protocol on the low speed channel, and routes the first high speed channel to the telephone interface and the second high speed channel to the signal processor.

A processor that receives and transmits messages through the protocol controller over the low speed channel to the telephone system, and in response to information received over the low speed channel, alternatively information received from the signal processor, the processor controls the data adapter.

DESCRIPTION OF THE DRAWINGS

A better understanding of the invention may be had from the consideration of the following detailed description taken in conjunction with the accompanying drawings, in which.

DESCRIPTION OF THE PREFERRED EMBODIMENT

Introduction

The present invention requires only two-wires, yet, provides a total of four channels, two 64 Kbps channels (one voice and one data), a 16 Kbps channel for communications between the DA and the CO, and a 8 Kbps auxiliary channel for communications with other devices on the line, i.e. repeaters.

Figure 1:
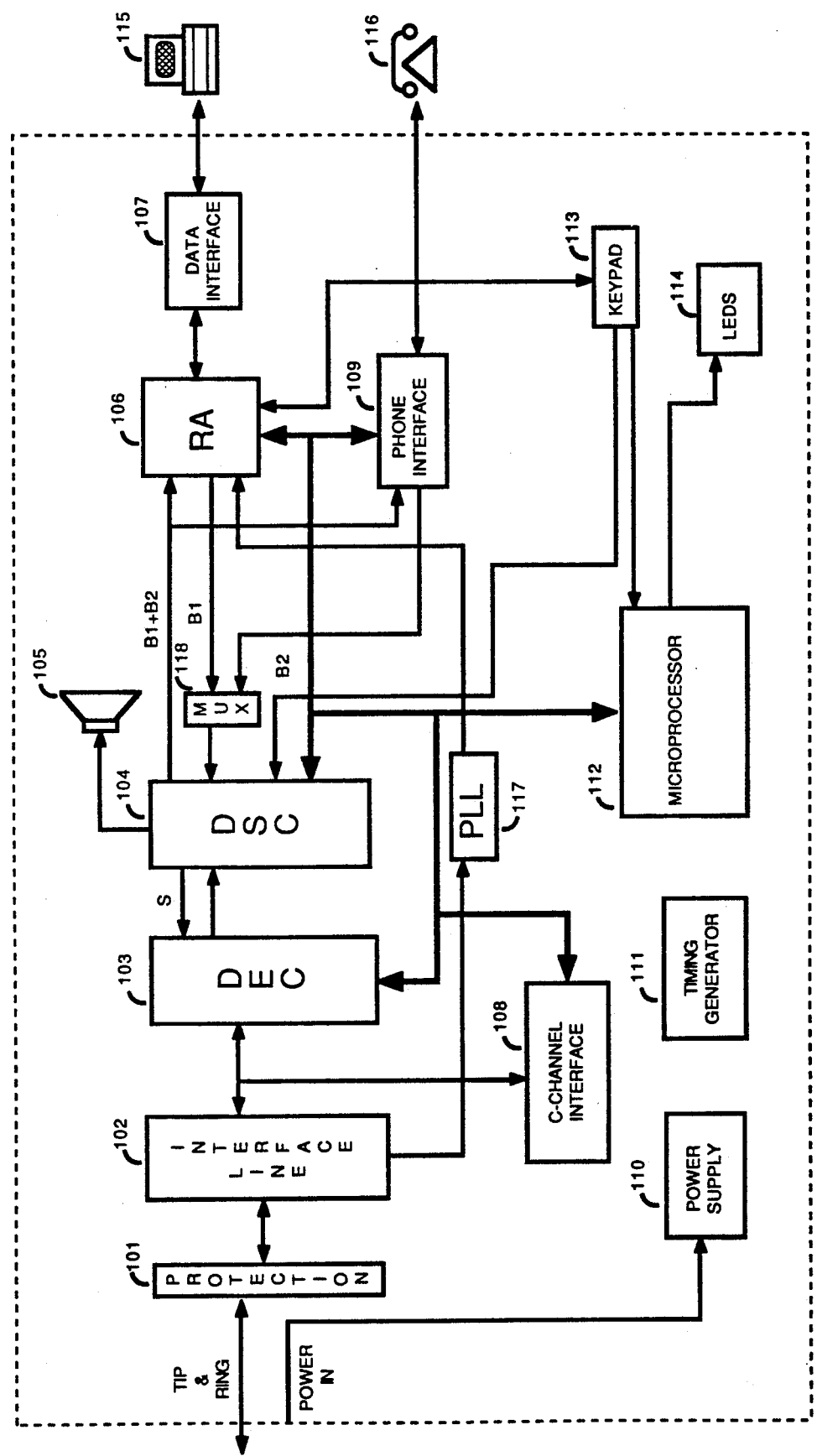
FIG. 1 is a block diagram of the Data Adapter in accordance with the present invention.

Turning now to FIG. 1 a general description of the Data Adapter will be given.

The DA simultaneously provides a high-speed data channel and a voice channel over the existing two-wire interface. The data interface 107 supports either synchronous or asynchronous data, in a V.35 or RS-232 EIA format. The voice channel is provided by a standard DTMF phone 116. Calls can be originated or terminated by using either the attached computer equipment 115, the attached phone instrument 116, or the DA's keypad 113.

Data from DATA INTERFACE 107 is passed to RA 106 where the data is "Rate Adapted" in accordance to the European Computer Manufacturers Association (ECMA) standard, onto one of the 64 Kbps channels. The voice signal is converted to a 64 Kbps Pulse Coded Modulation (PCM) signal by PHONE INTERFACE 109 and occupies a second 64 Kbps channel. Both 64 Kbps channels are multiplexed along with data from MICROPROCESSOR 112 for the 16 Kbps channel by MUX 118 and then shifted into Digital Subscriber Controller (DSC) 104. These three channels are converted to an analog signal suitable for transmission over a four-wire interface, one such format is the Integrated Services Digital Network (ISDN) S interface signal. The analog signal from the DSC is received by Digital Exchange Controller (DEC) 103 and converted back to a digital Time Division Multiplexed (TDM) signal. At this point, a 64 Kbps control channel from C-CHANNEL INTERFACE 108 is multiplexed into the TDM data stream. The C-CHANNEL is used to control and determine status of LINE INTERFACE 102. Note: the 8 Kbps auxiliary channel is part of this control channel.

The digital TDM data stream from DEC 103 and the 8 Kbps auxiliary channel are converted into an appropriate signal for transmission over a twisted-pair line. The signal from LINE INTERFACE 102 is transmitted through a PROTECTION circuit 101 to the Central Office (CO), where an identical line interface receives the signal and reconstructs the digital data.

Information received from the CO is processed in the reverse order of that stated above.

The DA includes a LOUDSPEAKER 105 for conveying call progress tones, ring tones, etc to the user. A KEYPAD 113 and mode select switches allow for various call-setup and programming alternatives. LEDs 114 are used to convey information about the status of the DA.

Functionally, the DA consists of two separate circuits: The Call Processing Computer (MP) and the Rate Adapter (RA). The former operates under control of MICROPROCESSOR 112; the later operates under a digital signal processor. The two intelligent processors communicate with each other via a bi-directional 8-bit registers. Each circuit will be described separately in the following sections.

Simultaneous voice/data involves a PHONE INTERFACE 109 to the DA to allow the connection of a standard DTMF phone as shown in FIG. 1. The phone is used for the voice connection as well as for tone dialing of voice calls. Because the appropriate voltage required for ringing is not available, the speaker on the DA itself is used for voice call alerting as well as data call alerting (separate ring frequencies are used to distinguish between the two types of calls). The PHONE INTERFACE is contained on a Data Adapter Phone Interface (DAPI) baby board.

Data Interface

The RS-232C/V.35 interface (DATA INTERFACE 107) circuits reside on DARI/DAVI baby boards, respectively. Note: only a RS-232C or V.35 is equipped at any one time. Serial communication to/from RS-232C and V.35 is controlled by RA 106. Data transfer rate is switch selectable via DIP-switches mounted on KEYPAD 113 baby board, or, automatic if Data Adapter operates in auto-baud mode. The RS-232C baby board is strap selectable to operate in one of the following modes:

DTE synchronous
DTE asynchronous
DCE synchronous
DCE asynchronous

The V.35 baby board is strap selectable to operate in one of the following modes:

DTE synchronous
DCE synchronous

Keypad Input

The KEYPAD 113 resides on the Data Adapter Keypad Interface (DAKI) baby board and is connected to a keypad encoder 74C922 chip. The encoder provides two key roll-over, debounce, and code conversion functions. When a key is pressed, the encoder registers the key and then issues an interrupt to MICROPROCESSOR 112 via the DSC's 104 hook switch line. A series of DIP switches also reside on the DAKI but are read by RA 106. These DIP switches are used to configure the DA.

Power Supply

The POWER SUPPLY 110 for the DA automatically allows for two different input voltages. For general usage, the input voltage is 24 VAC from a wall mounted transformer. If operation of the DA is desired during AC power outages (e.g. to enable emergency voice calls), then the power input can be −48 VDC from a centralized, battery backed-up power source. Internally, the power supply provides +/−5 VDC, +/−15 VDC, and −48 VDC.

Central Office Interface

Still referring to FIG. 1, the LINE INTERFACE 102 circuit is comprised of a Digital Interface Circuit (DIC) and associated circuitry, and is transformer coupled to a two wire line to the CO. The DIC provides a high-speed, full duplex digital transmission link using echo-cancelling techniques. This circuit in turn interfaces to the DEC 103 and DSC 104. The later device provides an interface to the SPEAKER 105 and PHONE INTERFACE 109.

Two channels at 64 Kbps, one channel at 16 Kbps, and an 8 Kbps maintenance or utility channel are transported between the DIC and equivalent circuit at the CO. One 64 Kbps channel is allocated for circuit switch data transmission, the other is for voice transmission. The 16 Kbps channel is used for the interchange of information between the CO and DA for call setup, release, ringing, call progress tone, etc..

The DIC chip, a MITEL 8972, operates in the slave mode. Phase Locked Loop (PLL) 117 locks onto the C4 (4.096 Mhz) clock from the DIC and generates a 1.344 Mhz for use by the baud rate generator in RA 106. This allows the clock signal and thus the USER equipment 115 to be synchronized to the CO. The DIC's C-

CHANNEL is used for transferring control and status information between the DIC and MICROPROCESSOR 112. All of the DIC's internal registers ar accessed through C-CHANNEL INTERFACE 108.

C-CHANNEL INTERFACE 108 is described in detail in U.S. Pat. No. 5,023,870, "AN INTERFACE CIRCUIT FOR DATA TRANSMISSION BETWEEN A MICROPROCESSOR SYSTEM AND A TIME-DIVISION-MULTIPLEXED SYSTEM". Additional information about the DIC chip can be found in MITEL's data book issue 5.

Digital Exchange and Subscriber Controllers (DEC, DSC)

The two circuit blocks are implemented with two VLSI chips from AMD, a 79C30 and a 79C31A (DSC and DEC respectively). As indicated in FIG. 1, the connection between the two parts is functionally an "S" reference point, as defined in CCITT recommendations for ISDN. This is a four-wire interconnection, with a pair for each direction and a predefined data rate and framing format. The principal function of the DEC is to adapt the "T" format data stream at the DIC interface to the "S" reference.

The DSC extracts two 64 Kbps (Bd and Be) channels (channels Bd and Be are assigned for data and voice, respectively) and provides them to the external data and voice circuits. The two channels can be programmed for connection to either one of the B1, B2 channels of the Line Interface Unit (LIU), inside the DSC itself.

The DSC also provides D channel features such as X.25 packet protocol, and interfaces to MICROPROCESSOR 112 for further D channel data processing. It also provides an analog interface to LOUDSPEAKER 105 for conveying audible signal information such as call progress tones, ring tones, etc., all under MICROPROCESSOR 112 control. Operation and release of keys on the keypad generate MICROPROCESSOR 112 interrupt via the HSW (HookSWitch) input to the DSC. Additional information can be obtained from AMD.

Rate Adapter Block

Figure 2A:
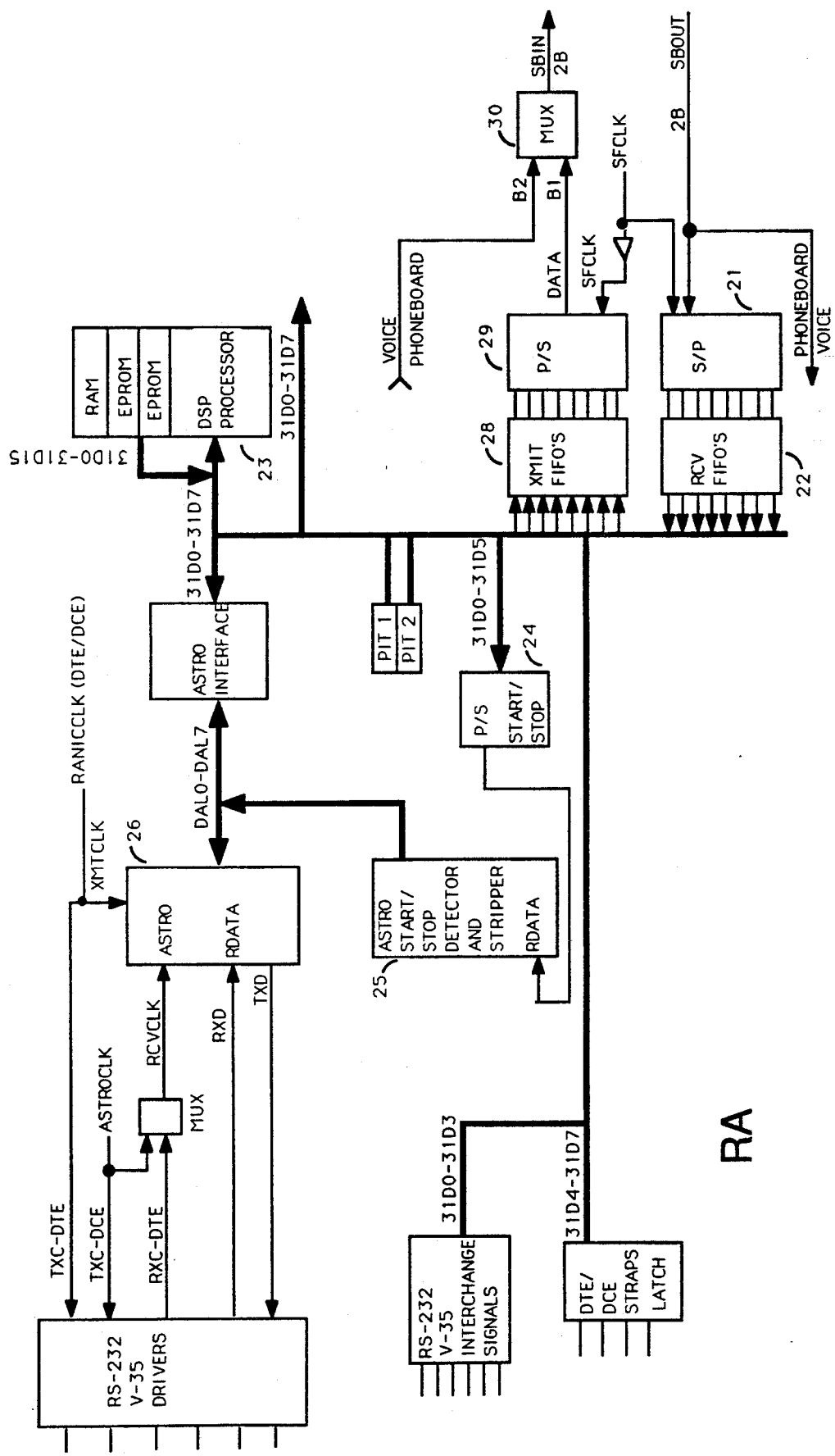
FIGS. 2A and 2B are a more detailed block diagram of the Data Adapter of FIG. 1.
Figure 2B:
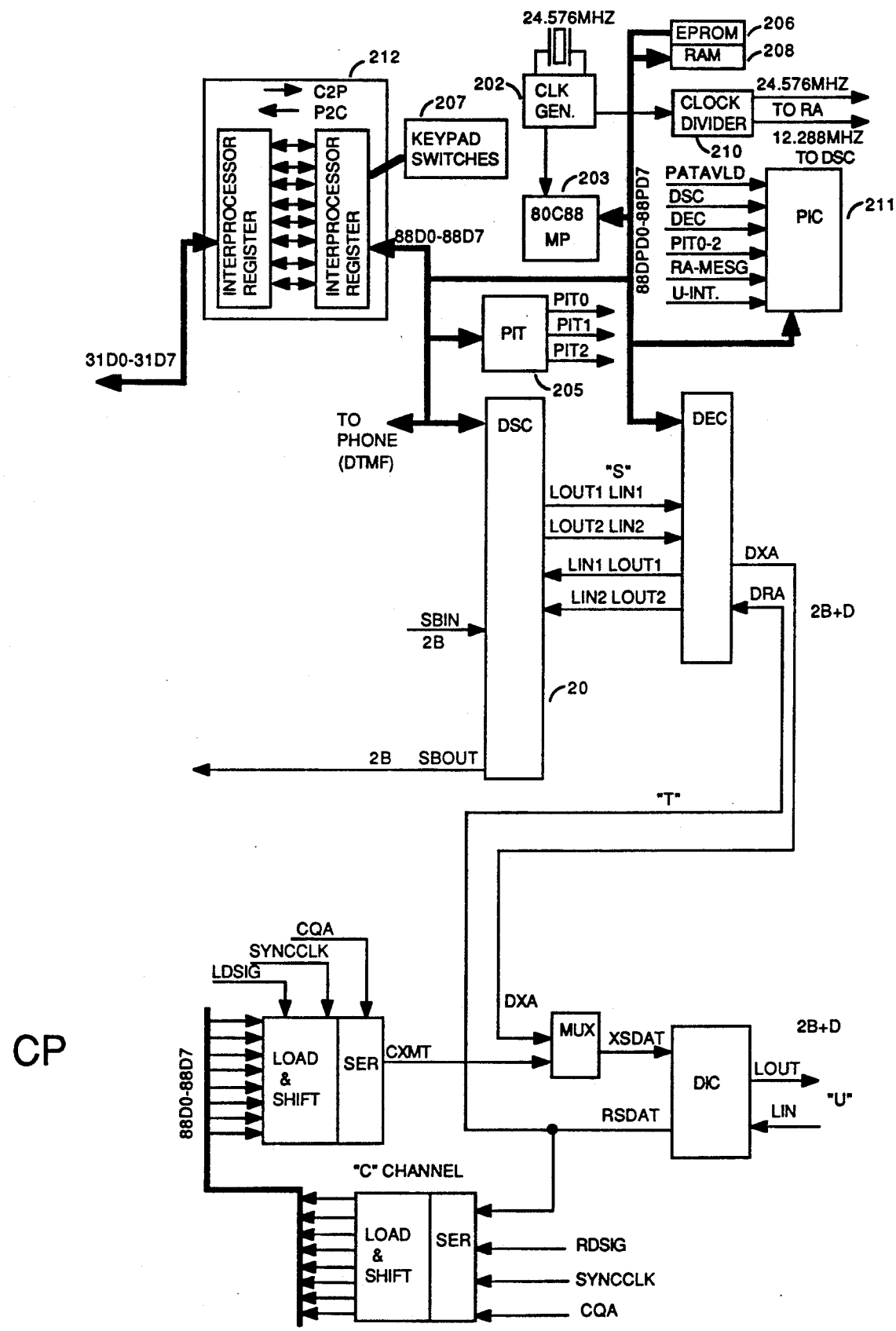

FIG. 2 shows the Rate Adapter RA section in more detail. A high level description of data flow in the RA will be given now. Data from the far end enters the RA from DSC 20 as explained above. This data is first converted from serial to parallel data by SERIAL-TO-PARALLEL CONVERTER 21. The parallel data is then loaded into RECEIVE FIFO 22. DSP 23 reads the data from RECEIVE FIFO 22 and "De-Adapts" the data based on ECMA-102. If an asynchronous rate is being used, DSP 23 writes the data into PARALLEL-TO-SERIAL CONVERTER 24. Data from PARALLEL-TO-SERIAL CONVERTER 24 is shifted into ASTRO#2 25 where the start and stop bits are removed. Once ASTRO#2 25 has reconstructed a data byte, DSP 23 is interrupted. The DSP then reads the data byte from ASTRO#2 25. The data is written to ASTRO#1 26 if ASTRO#1 26 is ready for more data. If ASTRO#1 26 is not ready, the data byte is stored in RAM until ASTRO#1 is ready. Synchronous rates do not undergo the bit striping.

In the other direction, data is first received by ASTRO#1 26 where the start and stop bits are removed. The DSP 23 reads the data from ASTRO#1 26 and "Adapts" it based on ECMA-102. This rate adapted data is then written into TRANSMIT FIFO 28. At the appropriate time, the data is transfer from TRANSMIT FIFO 28 into PARALLEL-TO-SERIAL CONVERTER 29. One, two, four, or eight bits are shifted out of PARALLEL-TO-SERIAL CONVERTER 29 into DSC 20 each frame.

Microprocessor

Still referring to FIG. 2 the MICROPROCESSOR (MP) 203 is an Intel 80C88, and operates at approximately 8 Mhz with four clock cycles per read/write operation, some slower devices may be accessed in five or six clock cycles. MP 203 provides a 20 bit address bus, of which the low order byte is multiplexed with data. EPROM 206 and RAM 208 are provided for program and data storage.

The 82C84 CLOCK GENERATOR 202 uses an external 24.576 Mhz crystal input which is divided by three to provide an 8.192 Mhz clock described above. The 24.576 Mhz out of the 82C84 OSC pin is divided by CLOCK DIVIDER 210 to supply 12.288 Mhz clock required by the DSC chip. On the Data Adapter Phone Interface (DAPI) baby board (802 of FIG. 3), this clock is divided further to supply 1.536 Mhz clock required by the COMBO chip.

The 80C88 is interrupt driven via Programmable lo Interrupt Controller (PIC) 211. The eight interrupt inputs to PIC 211, which are individually maskable, are
Loss of sync from DIC
DSC interrupt
DEC interrupt
PIT timer 0 output interrupt
PIT timer 1 output interrupt
PIT timer 2 output interrupt
DSP interrupt
Utility channel interrupt The 80C88 also interfaces to a number of on-board peripheral devices such as PIT 205, PIC 211, DEC, DSC, LED 207 etc. and several external baby boards such as DAKI (keypad 207) and DAPI (phone).

Interprocessor Register

MICROPROCESSOR 203 communicates with DSP 23 of the RA section through INTERPROCESSOR REGISTER 212. INTERPROCESSOR REGISTER 212 is a bi-directional eight bit register mapped into the I/0 space of both MICROPROCESSOR 203 and DSP 23. Seven bits are used to convey information and the eighth bit is used as an interrupt signal. Therefore, for example, when MICROPROCESSOR 203 sends a message to DSP 23, it writes a data byte into INTERPROCESSOR REGISTER 212 with the eighth bit set to a logic one. The logic one generates an interrupt to the DSP who then reads the message. Messages from the DSP to the MICROPROCESSOR are transferred in the same manner. Some of the messages transfer between MICROPROCESSOR 203 (MP) and DSP (RA) are shown in TABLE 1.

TABLE 1

| Interprocessor Messages | |
|---|---|
| MP to RA | D7 ... D0 |
| Reset | 1001 0000 |
| Perform Self Check | 1001 0001 |
| Set Operating Mode (i.e. read DIP switches) | 1001 0010 |
| Set Interchange Circuit Outputs (0 ... 15) | 1110 xxxx |
| Read Interchange Circuit Inputs | 1100 0000 |
| Connect to Line | 1100 0001 |
| Disconnect from Line | 1100 0010 |

TABLE 1-continued

Interprocessor Messages

| | |
|---|---|
| Report Operating State | 1100 0100 |
| Echo Back Command(s) | 1010 1010 |
| | 1101 0101 |
| RA to MP | |
| Reset Complete (0 . . . 1) | 1001 000x |
| {0 = Fail, 1 = Success} | |
| Self Check Complete (0 . . . 1) | 1001 001x |
| {0 = Fail, 1 = Success} | |
| Accept | 1001 0100 |
| Reject | 1001 0101 |
| Interchange Circuit Leads Status (0 . . . 15) | 1110 xxxx |
| Operating State (1 . . . 9) | 1100 xxxx |
| Echo Back Command(s) | 1010 1010 |
| | 1101 0101 |

A short description on the above messages:

RESET: This is a command by the MP for the RA to perform a complete reset. This routine will mask all interrupts and return with an indication to jump to the reset routine.

PERFORM SELF CHECK: This is similar to the above command.

SET OPERATING MODE: This is a command to read the DIP switches to determine the operating mode. If the mode changed, this may cause a reset.

SET INTERCHANGE CIRCUIT OUTPUT LEADS: This command informs the RA to take the information included in the message and set the appropriate interchange leads. A "0" corresponds to the ON condition and a "1" to the OFF condition. Which leads are set is dependent upon the DCE/DTE operating mode and shown below:

| | Interchange Circuit Outputs | |
|---|---|---|
| Bit # | DCE Mode | DTE Mode |
| 0 | 106 | 105 |
| 1 | 107 | 108.2 |
| 2 | 109 | x |
| 3 | 125 | x |

READ INTERCHANGE CIRCUIT INPUT LEADS: This command informs the RA to read the interchange lead inputs and report back with their state. This routine will read the particular leads shown below, enqueue a message back to the MP with the results, and set the C2P Message Flag. MP will monitor the flag for eventual transmission of the message.

| | Interchange Circuit Outputs | |
|---|---|---|
| Bit # | DCE Mode | DTE Mode |
| 0 | 105 | 106 |
| 1 | 108.2 | 107 |
| 2 | x | 109 |
| 3 | x | 125 |

CONNECT TO LINE: This command instructs the RA to connect to the B-Channel. This routine will set the Local Connect Request Event flag which will be checked by MP.

DISCONNECT FROM LINE: This is the reverse of the above command.

REPORT OPERATING STATE: This command informs the RA to read the operating state and report back with the state.

ECHO BACK: These commands are used by the MP to check for stuck bits in the interprocessor registers. The MP will send one of the two commands, and the RA will respond with the identical bit pattern response message.

This list is not meant to be exhaustive: additional messages are needed to convey digit information, call progress messages, baud rate, etc. This type of information is generally application specific and can be implemented as required for each individual application.

Simultaneous Voice/Data

Figure 3:
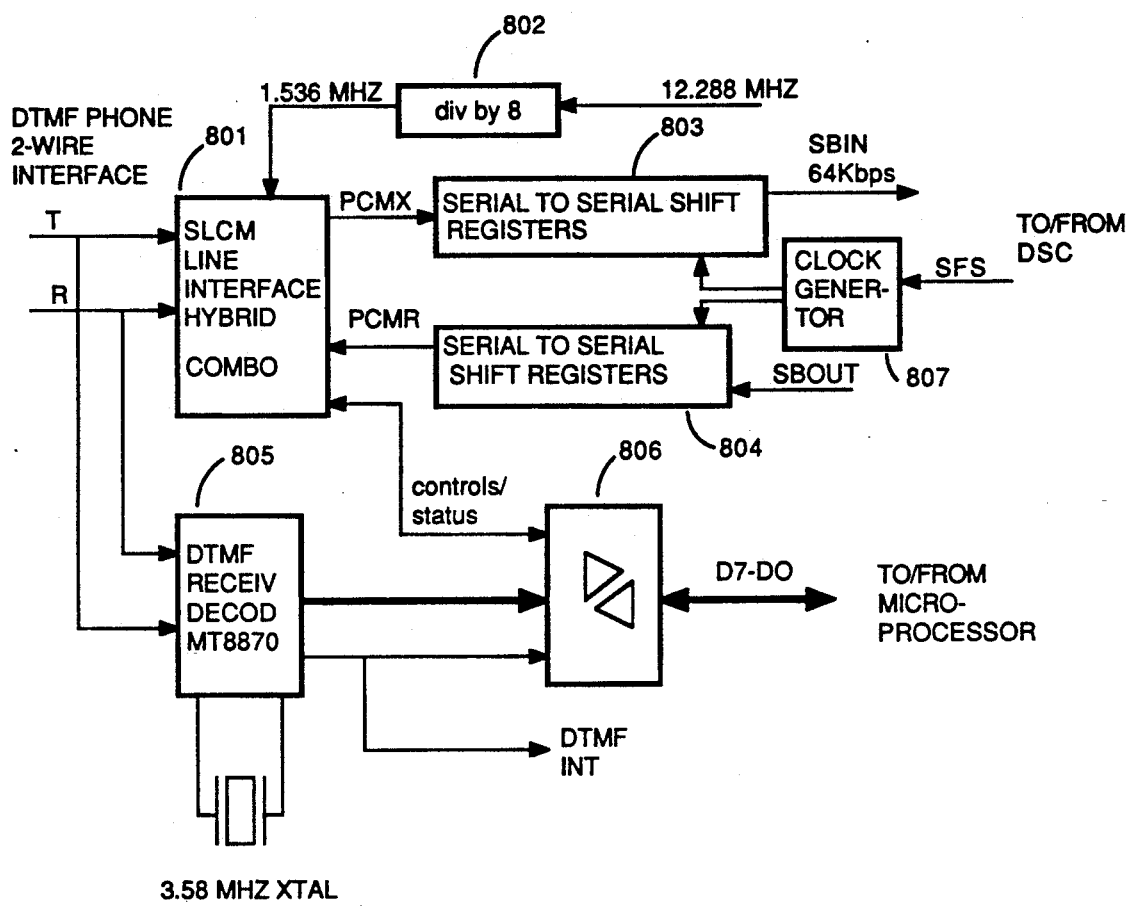
FIG. 3 is a block diagram of the Data Adapter's phone interface.
Figure 4:
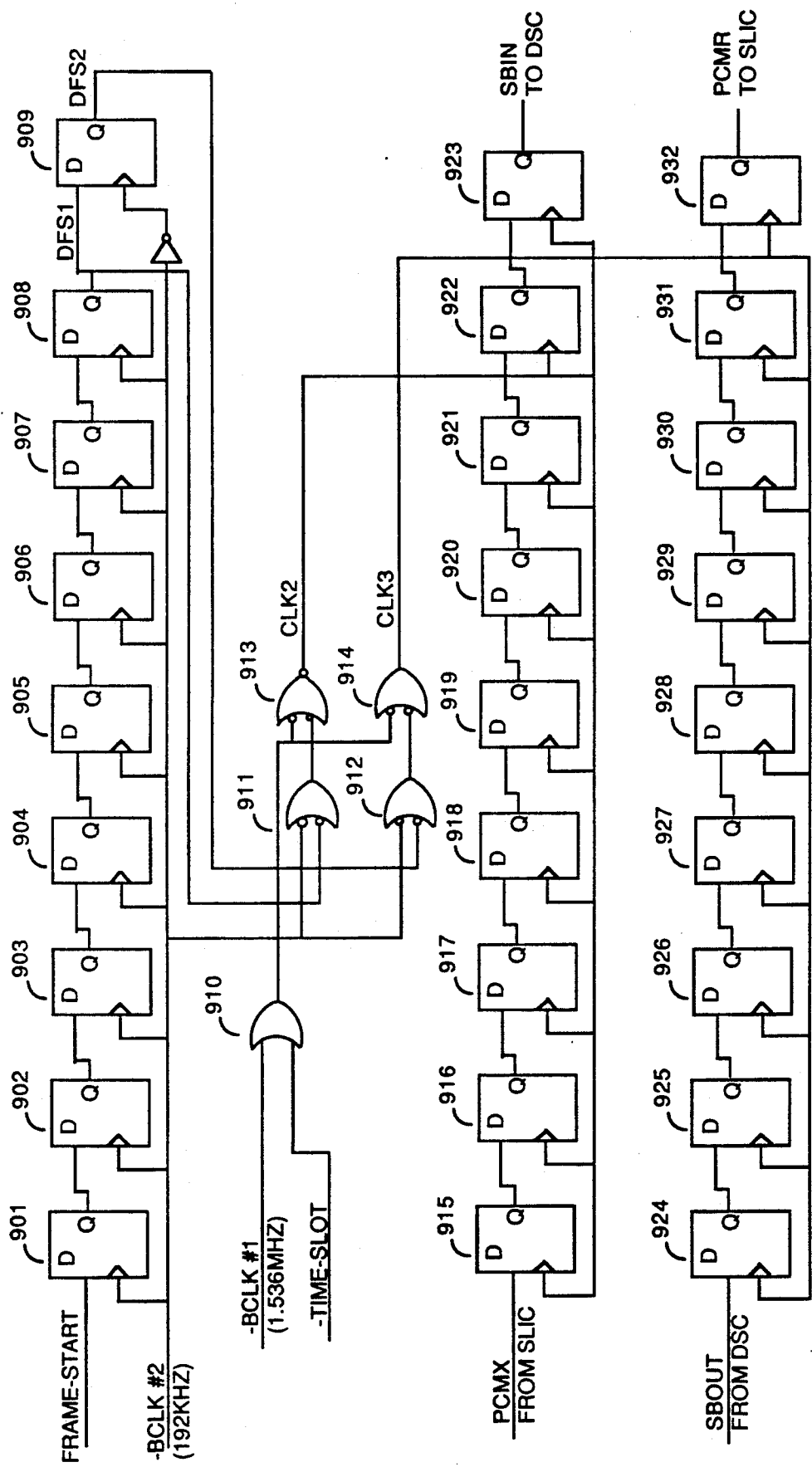
FIG. 4 is a schematic diagram of the serial interface for the Data Adapter's phone interface.

Referring to FIGS. 3 and 4, the simultaneous voice/data feature involves a line interface to the DA to allow the connection of a standard DTMF phone instrument to the DA. This phone is used for the voice connection as well as for tone dialing of voice calls. Because the appropriate voltage required for ringing are not available, the speaker on the DA itself is used for voice call alerting as well as data call alerting (separate ring frequencies are used to distinguish between the two types of calls).

To provide the voice connection, a separate Subscriber Line Interface Circuit (SLIC) 801 resides on the DA. The voice port of the DSC cannot be used due to limitations within the DSC chip with only one analog channel. These limitations would cause interference with a data call setup during the time when a voice call is in progress.

The implementation of SLIC 801 includes such items as the CODEC, filter, and control, and is taught in patent application Ser. No. 445,517, "A SOLID STATE TELEPHONE LINE CIRCUIT". Data from SLIC 801 is converted from the 1.536 Mbps to the 192 Kbps of the DSC by SERIAL-TO-SERIAL SHIFT REGISTER 803. Data in the opposite direction is converted by SERIAL-TO-SERIAL SHIFT REGISTER 804.

Because a standard DTMF phone is attached to the DA rather than just a handset, the phone itself is used for "dialing". Therefore, a DTMF receiver 805 is required to detect and decode the dialing tones.

FIG. 4 shows the SERIAL-TO-SERIAL REGISTERS as a chain of D-FFs with a common clock input. This arrangement allows data to be clocked into the chain where it is stored until it is clocked out. As a result, while data is being clocked into SERIAL-TO-SERIAL REGISTER 915-923, "DON'T CARE" data is being shifted out.

The control generator's (901-914) primary function is to generate signals CLK 2 and CLK 3 at the correct time and with the correct frequency. SLIC 801 has a bit rate of 1.536 MBPS and DSC has a bit rate of 192 Kbps. In other words, SLIC 801 has 24 time-slots each with a data rate of 64 Kbps and DSC has 3 time-slots each with a data rate of 64 Kbps. Time-slot #1 of SLIC 801 is mapped into time-slot #2 of DSC. That is, data is converted between SLIC 801 time-slot #1 and DSC time-slot #2.

At the start of a frame, signals DFS1 and DFS2 (Delayed Frame-Start) are logic low and will remain low for eight clock cycles of BCLK 2 (Bit rate Clock for DSC). The signal BCLK 2 is blocked from clocking the SERIAL-TO-SERIAL REGISTERS by GATES 911 and 912 while DFS1 and DFS2 signals are a logic low.

GATE 910 will pass BCLK 1 (Bit rate Clock for SLIC 801) only when the signal -TIME-SLOT is a logic low. Note: the -TIME-SLOT signal is generated by SLIC 801. Once the signal -TIME-SLOT becomes a logic low, GATE 913 and 914 generate signals CLK 2 and CLK 3 respectively. The signal -TIME-SLOT remains a logic low for exactly eight clock cycles of BCLK 1. During this time eight data bits are shifted into D-FFs 915-922 and eight data bits are shifted out of D-FFs 925-932.

When the signal -TIME-SLOT returns to a logic high, the output of D-FF 922 represents the first bit shifted in from PCMX and the output of D-FF 932 represents the last bit shifted out to PCMR. Also, CLK 2 and CLK 3 are forced to logic high and logic low respectively.

Some time after -TIME-SLOT has returned to a logic high, the signal FRAME-START (SFS, from DSC) will have propagated through D-FFs 901-909. At this time DFSI and DFS2 will change to a logic high allowing BCLK 2 to pass through GATES 911 and 912. Because -TIME-SLOT is a logic high, the output signals of GATES 911 and 912 will pass through GATES 913 and 914 to become CLK 2 and CLK 3 respectively. Signals DFSI and DFS2 remain a logic high for exactly eight clock cycles of BCLK 2. During this time eight data bits are shifted out of D=FFs 916-923 and eight data bits are shifted into D-FFs 924-931.

Rate Adapter Circuit (RA)

The RA performs the necessary Rate Adaption/De-adaption based on the ECMA-102 standard. A brief description of the ECMA-102 standard will be given before a detailed discussion about the present invention. It is assumed that the reader has either a copy of the ECMA standard or a working knowledge of it, and therefore, this section is not meant to be a tutorial. Because most of the rate adaption/de-adaption is preformed by firmware, a simple EPROM change can change the rate adaption protocol; by increasing the size of the EPROM, additional protocols can be included.

Figure 6:
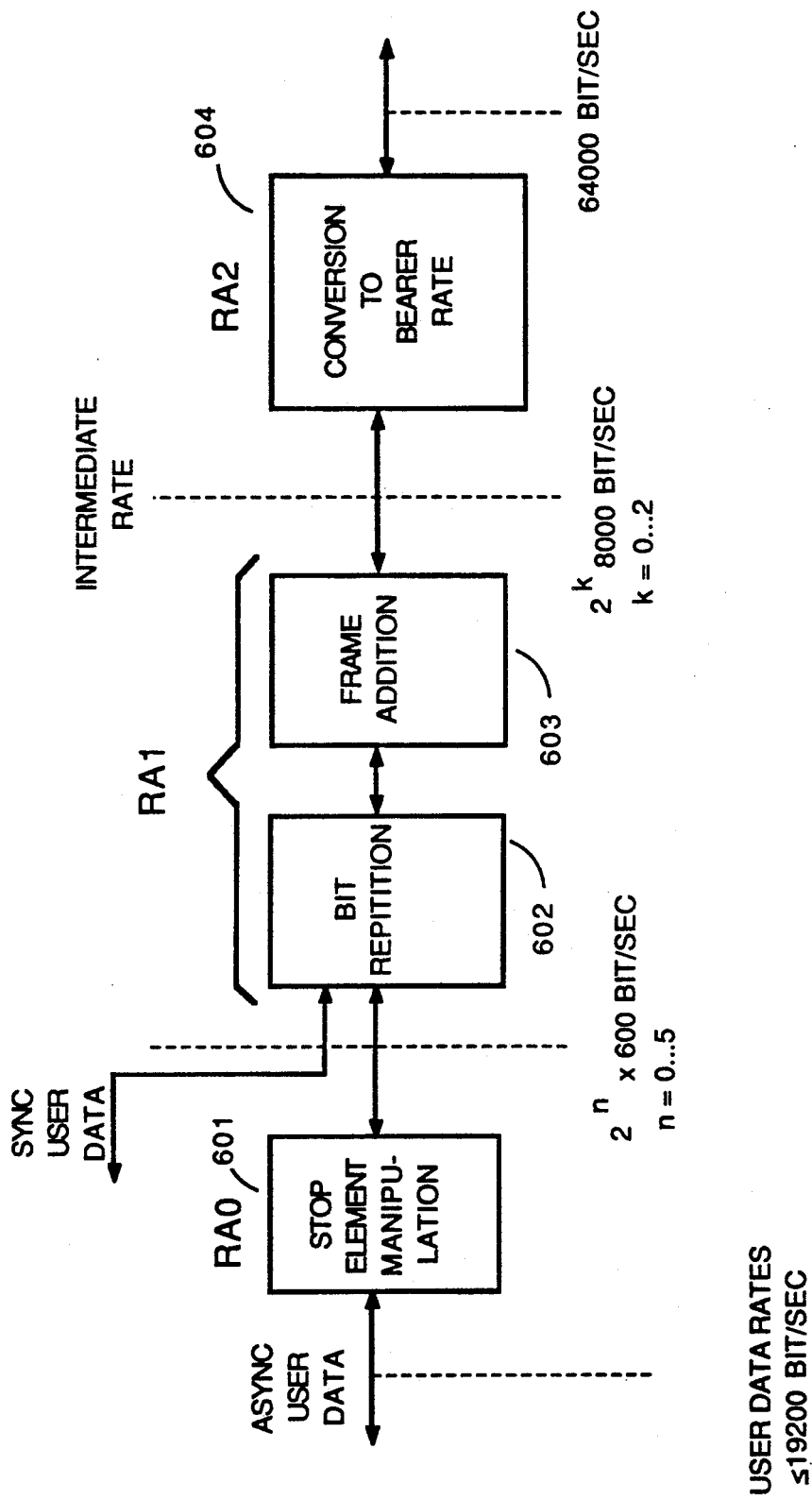
FIG. 6 is a block diagram of the rate adaption/de-adaption process.

Referring to FIG. 6, where the basic process of rate adaption/de-adaption is shown, the process is logically divided into three steps. The RA0 function is only used with asynchronous User data and generally converts this asynchronous data to synchronous data. Incoming asynchronous data is padded by the addition of stop bits to fit the nearest channel defined by:

Data rate = $2^n \times 600$ bps, where n = 0 ... 5

Thus, a 2400 baud user data stream would fit into a 2400 synchronous data rate (n=2). For a 7200 baud user data stream to fit into a 9600 synchronous data rate (n=4), additional stop bits are added to fill in the time. The resultant synchronous data is fed to RA1. Synchronous User data does not undergo the RA0 step because it is already synchronous. (But see, Network Independent Clocking section.)

The RA1 function takes either the output of RA0 or User synchronous data (Herein: also called an RA0 rate), and preforms a bit repetition and framing function to fill an intermediate data channel of 8, 16, or 32 Kbps. An 80-bit frame is used, as shown in TABLE 3. The adaptation of the 600, 1200, and 2400 bps RA0 rates to the 8 Kbps intermediate rate, including bit repetition are shown in TABLES 4, 5, and 6 respectively. The adaptation of 7200 and 14400 bps RA0 rates to the 16 and 32 Kbps intermediate rates respectively are shown in TABLE 7. While, the adaptation of 4800, 9600 and 19200 bps RA0 rates to the 8, 16, and 32 Kbps intermediate rates, respectively, are shown in TABLE 8. Adaptation of 48 Kbps uses TABLE 10, 56 Kbps uses TABLE 9, and 64 Kbps uses TABLE 11. The definition of the S and X bits is shown in TABLE 13, and the definition of the E bits is given in TABLE 12.

The third step of the rate adaption (RA2) converts either the output of the previous step (RA1) or high speed synchronous user data (48, 56, or 64 Kbps) to the bearer rate of 64 Kbps. This is accomplished by using anywhere from one to all eight data bits available in the 64 Kbps channel.

The de-adaption works in the reverse order.

Digital Signal Processor (DSP)

Figure 5:
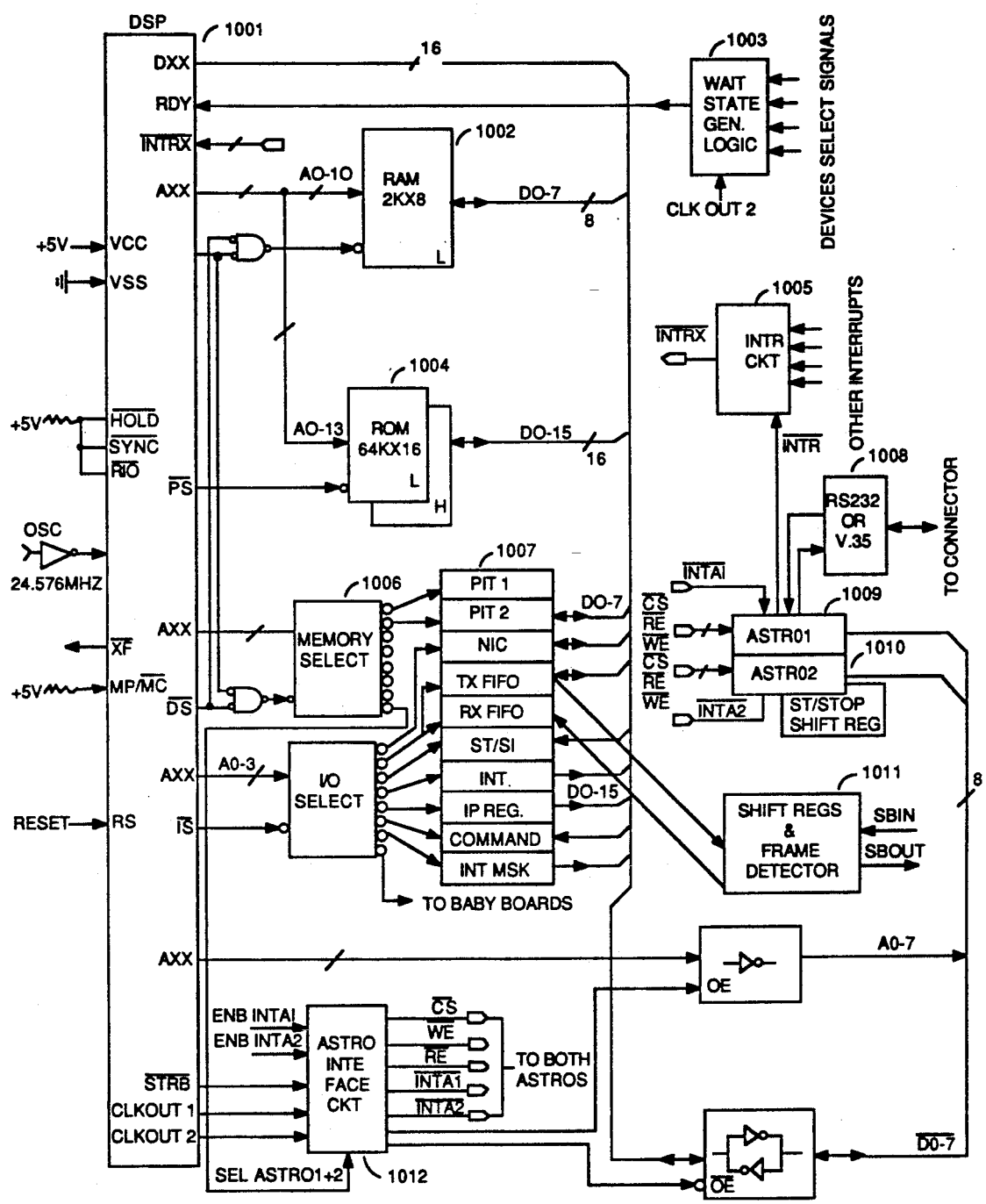
FIG. 5 is a block diagram of the Rate Adapter

Referring to FIG. 5. Due to extensive data manipulation by firmware for rate adaption/de-adaption, a TMS320C25 DSP 1001 is used. The 16-bit DSP is designed to execute one instruction per clock cycle, at 10 Mhz real clock speed. However, for this RA circuit, the DSP will run at 6.144 Mhz real clock speed or clock period equal 162.5 nano-seconds. On-chip data and memory accesses are performed in one clock cycle; accesses to external ROM 1004, RAM 1002, Tx/Rx FIFO's 1007, control and status registers 1007 take two clock cycles. Accesses to PIT 1007 and ASTRO chips 1009 and 1010 are done in three and five clock cycles, respectively.

Two EPROM memory chips 1004 are organized to form a 16K×16 word for program storage which occupies the program memory space. However only one low order byte RAM 1002 is provided which occupies the lower memory data space.

DSP 1001 has three interrupt inputs; each interrupt may operate in either level or edge triggered mode. Each interrupt input is individually maskable inside the DSP chip and are assigned as follow:

INT0: ASTRO#1 or XMIT—FIFO or Start/Stop bit (ST/ST)

INT1: ASTRO#2 or RCV—FIFO or In-Frame-Latch (IFL)

INT2: P2C—INT

The DSP interfaces to a number of on-board peripheral devices such as PIT1, PIT2, ASTROs, FIFOs, Start/stop detector circuit, control and status registers. It also interfaces to external baby boards DARI and DAVI via 36 contact receptacle and plugs and the DIP switches on the DAKI.

Block 1007 of FIG. 5 contains many of the standard devices shown as a block or registers. It is not necessary to show all the connections, such as address, data, and control because this is dependent on which IC is chosen to accomplish the stated task. Each sub-block of 1007 is described in greater detail in the following sections.

The following are accessed as memory by DSP 1001:

| | |
|---|---|
| EPROM | 1004 |
| RAM | 1002 |
| PIT1 | 1007 |
| PIT2 | 1007 |
| ASTRO#1 | 1009 |
| ASTRO#2 | 1010 |

The following are accessed as I/0 by DSP 1001:

| | |
|---|---|
| Receive FIFO | 1007 |
| Transmit FIFO | 1007 |
| Interprocessor register | 1007 |
| Command Register | 1007 |
| Status Register | 1007 |
| Network Independent Clocking | 1007 |
| Start/Stop shift register | 1007 |
| Interrupt Register | 1007 |
| Interrupt Mask Register | 1007 |

ASTRO (UC1671)

A Western Digital UC1671 Async/Sync Transmitter/Receiver (ASTRO) is a synchronous/asynchronous serial communication controller. The device was selected because of its ability to shorten or lengthen stop bits, and still receive proper data even without stop bit. This is required to support overspeed/underspeed feature as described supra.

Two ASTRO chips are provided; ASTRO#2 1009, for communication with either the RS-232C or V.35 serial ports; ASTRO#1 1010, is used as a start/stop bit detector to remove stop bits and extract only the real data from the incoming B-channel data stream.

A special DSP to ASTRO interface circuit 1012 is used because: First, the ASTRO has multiplexed address/data input lines and the DSP has separate address and data output; Second, the ASTRO chip select, read, and write signals must be properly generated; and third, a special interrupt acknowledge cycle must be performed by software and hardware to reset an ASTRO generated interrupt. Note that both ASTROs use the same interface circuit. Each ASTRO identifies its being accessed by comparing the address input with its preassigned ID code. Additional information can be obtained from the DATA sheet.

There are several constraints imposed on software, after reading an ASTRO chip: 1) A delay of two clock cycles is required between a read or write to the same ASTRO chip; 2) Software must generate an interrupt acknowledge cycle at the end of interrupt service routine, one for each ASTRO. This cycle may be generated by performing the following steps:

a). For example DSP receives ASTRO#1 interrupt;
b). DSP services interrupt in (a);
c) DSP must set control bit "enable INTA" for ASTRO#1;
d). DSP performs dummy ASTRO#1 read cycle, make sure that address A0 =0; this is an INTA cycle seen by the ASTRO. This resets ASTRO#1 interrupt; and
e) Finally DSP must reset control bit which was set in (c).

Additional information about the ASTRO interface can be found in U.S. Pat. No. 4,991,170, "A CIRCUIT FOR INTERFACING A DIGITAL SIGNAL PROCESSOR TO A SERIAL INTERFACE CONTROLLER".

Start-Stop Bit Detector (ST/SI)

Start-stop bit detection is performed by ASTRO#2 chip 1010, in combination with a parallel-to-serial shift register and start-stop shift register control circuitry 1007. The circuit applies only to asynchronous operation.

Referring to FIGS. (11)A and B, the DSP (1001 of FIG. takes the incoming rate adapted frame from the receive FIFO 1105, shifts it one bit to get rid of first bit (always 1 see TABLE 3), then writes this data to the parallel-to-serial register 1201. The data is latched on the rising edge of -LDST/ST which is generated by the DSP. (Note that parallel-to-serial register 1201 contains both a parallel register and a serial shift register.) The rising edge of SALD transfers the data from the parallel register to the serial shift register; SALD is generated automatically by hardware. SALD also generates an ST/ST interrupt to DSP 1001 requesting a new data byte be loaded into register 1201. This automatic loading will stop if no new data is written to the parallel register. The data is then shifted out of the shift register by ST/STCLK. This byte potentially contains a number of start and/or stop bits, along with character bits.

Data out of the shift register is received by ASTRO#1 1202. The ASTRO detects the start bit in the serial stream, strips off the start and stop bits, and signals the DSP (1001 of FIG. 5), via an interrupt, that a data character is available.

Programmable Interval Timer (PIT)

Still referring to FIGS. (11)A and B, accesses to the two PITs 1102 and 1103 (82C54) are performed in three clock cycles, with a recovery time between commands of 200 nano-seconds. One constraint imposed on software/firmware is that, after performing PIT's read operation, the DSP must pause for one clock cycle prior to resuming normal bus operation. This is due to the PIT's slow turn off characteristic and prevents two devices from driving the data bus at the same time.

Each PIT has a total of three programmable timers and each timer can operate in any one of six modes. (Additional information can be obtained from the data sheet.)

PIT1 (1102): Timer 1 is used for baud rate generation to ASTRO#1 1009 and has a clock input of 1.344 Mhz from the PLL (117 of FIG. 1) for synchronous data and a clock input of 12.288 Mhz for asynchronous data. Timer 2 is used to clock the START/STOP parallel-to-serial converter circuitry and has a 1.344 Mhz clock. Timer 3 is used clock data into and out of the 64 Kbps data channel and has a 6.144 Mhz clock.

PIT2 (1103): Timer 1 is used as an interrupt generator and has a 4 Khz clock. Timer 2 is also used as an interrupt generator but has a clock of 6.144 Mhz. Timer 3 clocks the START/STOP bit ASTRO 1010 and has a clock of 6.144 Mhz.

B-Channel Data Circuit

The third step of the rate adaption (RA2) is accomplished by strobing PARALLEL-TO-SERIAL REGISTER 1107 with 1, 2, 4, or 8 pulses per frame. Any remaining bit times are filled with ones by gate 1109. Data from/to DSC is clocked using a gated version of SCLK (SFCLK). The DSC supplies SCLK and SFS signals where, SCLK is the bit rate clock and SFS indicates the start of a frame. The actual data rate transferred through the channel is programmable and under control of PIT2 (1102 of (11)A).

Because PIT2 (1102 of FIG. (11)A) is programmed in mode 1 (a retriggerable one shot), when PIT2 (1102 of FIG. (11)A) is triggered by DSFS, its output goes low for the programmed interval, thus gating the SCLK output and thereby generating SFCLK. A count of 32 equals one cycle of SCLK, and the desired sequence is obtained by programming a multiple of 32 counts into the timer, minus 2 to avoid glitches from being generated on the SFCLK. So the actual data rate may be one, one-half, one-fourth, or one-eighth of one B-channel, effectively producing a 64, 32, 16, 8 Kbps data rate.

B-Channel Data Framing Detector and Byte Counter

When user data is at or below 19.2 Kbps (RS-232C operation), it is formatted into 80-bit frames (shown in TABLE 3) in which one byte out of ten is all zeros. The remaining nine bytes have a "1" in the first bit position.

There is circuitry 1011 for detecting the all zero byte and then setting a latch and an interrupt (IFL) to indicate an in-frame condition. Once in-frame, the following data bytes are automatically loaded into the receive FIFO firmware performs framing checks, and can reset the in-frame latch to force a new check for a zero byte.

The data framing detector and byte counter is described in greater detail in Patent application Ser. U.S. Pat. No. 5,058,141, "A SINGLE CIRCUIT FOR DETECTING A FRAME SYNCHRONIZATION PATTERN AND GENERATING CONTROL SIGNALS".

Asynchronous Overspeed Control

Referring to FIG. 5 and TABLE 2. The common method of providing overspeed control is to utilize the Clear to Send (CTS) lead to the terminal to provide a method of flow control. This is controlled by firmware when it detects that the input data characters from the terminal are being received faster than they are being put into the B-channel.

A different method is implemented in the present invention. This method involves the deletion of stop bits (up to one deleted stop bit for every eight data bytes) by the transmitting DA's rate adaptation firmware. The DA on the receiving end will detect the missing stop bits and reinsert them. The receiving DA will also shorten the length of the output stop bits (all if necessary) by ⅛th of a stop bit. By shortening the stop bit by ⅛th, the effective baud rate is increased by 1/80 (assuming 1 start bit, 8 data bits and 1 stop bit). This would allow for an overspeed of 1.25%—more than enough to allow the required 1.0% overspeed on the input.

In order to implement this feature, a Western Digital UC1671 Async/Sync Transmitter/Receiver (ASTRO) is used as a start/stop bit detector 1010 of ASTRO, upon detecting a stop bit of zero, will set the framing error flag and assume this bit to be the start bit of the next character. This will allow correct operation even though the stop bit of one character is missing.

The second requirement is to use another ASTRO (1009 of FIG. 5) to connect to the terminal. This device provides the capability to shorten the transmitted stop bits by 1/16th. By shortening each stop bit by 1/16th, the effective baud rate is increased by 1/160 (assuming 1 start bit, 8 data bits and 1 stop bit). This would allow for an overspeed of 0.625%.

To make up for the other 0.625%, the baud rate clock for the ASTRO is increased when necessary (i.e. when the firmware detects its data buffers are filling up), and when possible (i.e. for baud rates of 2400 and less). This will have the effect of increasing the output baud rate. This baud rate clock is provided by a Programmable Interval Timer (PIT1 1007) which takes a 12.288 MHz clock and divides it by a programmable value. The output of the PIT provides the required 32X baud rate clock for the ASTRO. These combined changes will have the effect of providing the same speed increase on the data output as mentioned above, while still keeping the baud rate on the output within 1.0% tolerance. For example, at 1200 baud, the normal PIT divisor, from TABLE 2, is 320. By changing this to 318, the baud rate is changed to 1208, for a change of 0.625%. Adding this to the change provided by the shortened stop bit provides a change of 1.25%.

For the slower baud rates and when the character length is only five bits, the effect of the shortened stop bit is greater. With five data bits, one start bit and one stop bit, the shortening of the stop bit by 1/16th effectively increases the baud rate by 1/112th or 0.89%. Adding in the change due to the altered baud rate clock provides an effective baud rate change of 1.52%. The suggested divisors to use for each baud rate are shown in TABLE 2 along with the percent change for an eight bit character. With a shorter data character, these percent changes would be proportionally larger. Also, to generate a larger percent change, the divisors can be changed by a larger amount.

Whenever the input baud rate is underspeed, the firmware will insert extra stop bits into the B-channel data. The effect is the same as if someone was slowly typing on a terminal. The inter-character time is filled with stop bits. The receiving DA will never see the extra stop bits. It will only see the data characters, and output these to the terminal via the ASTRO. The inter-character time on this output is automatically filled with stop bits by the ASTRO.

Network Independent Clocking

The DA normally derives its baud rate timing from the received bit stream of the DA/Network interface, through the PLL 117 of FIG. 1, and PIT1 1007 of FIG. 5. This timing is used by the DA to provide the connected synchronous equipment with transmitter element timing on Circuit 114 and receiver element timing on Circuit 115. However, for cases where the equipment is unable to accept timing (e.g. a synchronous master modem), it is necessary to carry clocking information across the link (B-channel). When the DA uses this option, it must generate and utilize clocks which are thus not necessarily synchronized to the network or each other.

Network Independent Clocking (NIC) is described in detail in co-pending application: "A NETWORK INDEPENDENT CLOCKING CIRCUIT WHICH ALLOWS A SYNCHRONOUS MASTER TO BE CONNECTED TO A CIRCUIT SWITCHED DATA ADAPTER", Ser. No. 07/615,524 filed on Nov. 19, 1990.

Message Flow

Figure 9:
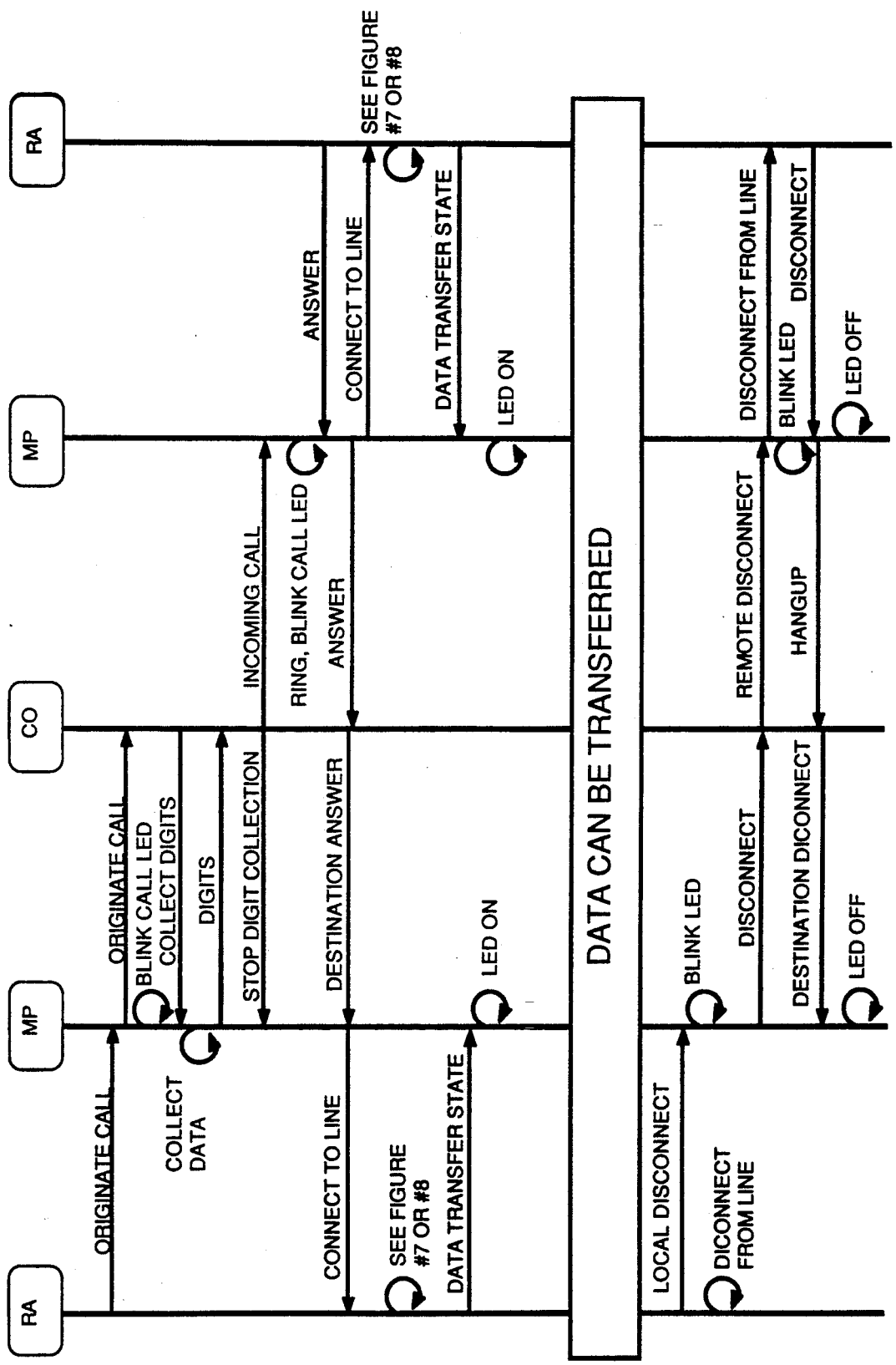
FIG. 9 shows some of the messages passed between the RA, MP, and the CO during a normal data call.
Figure 10:
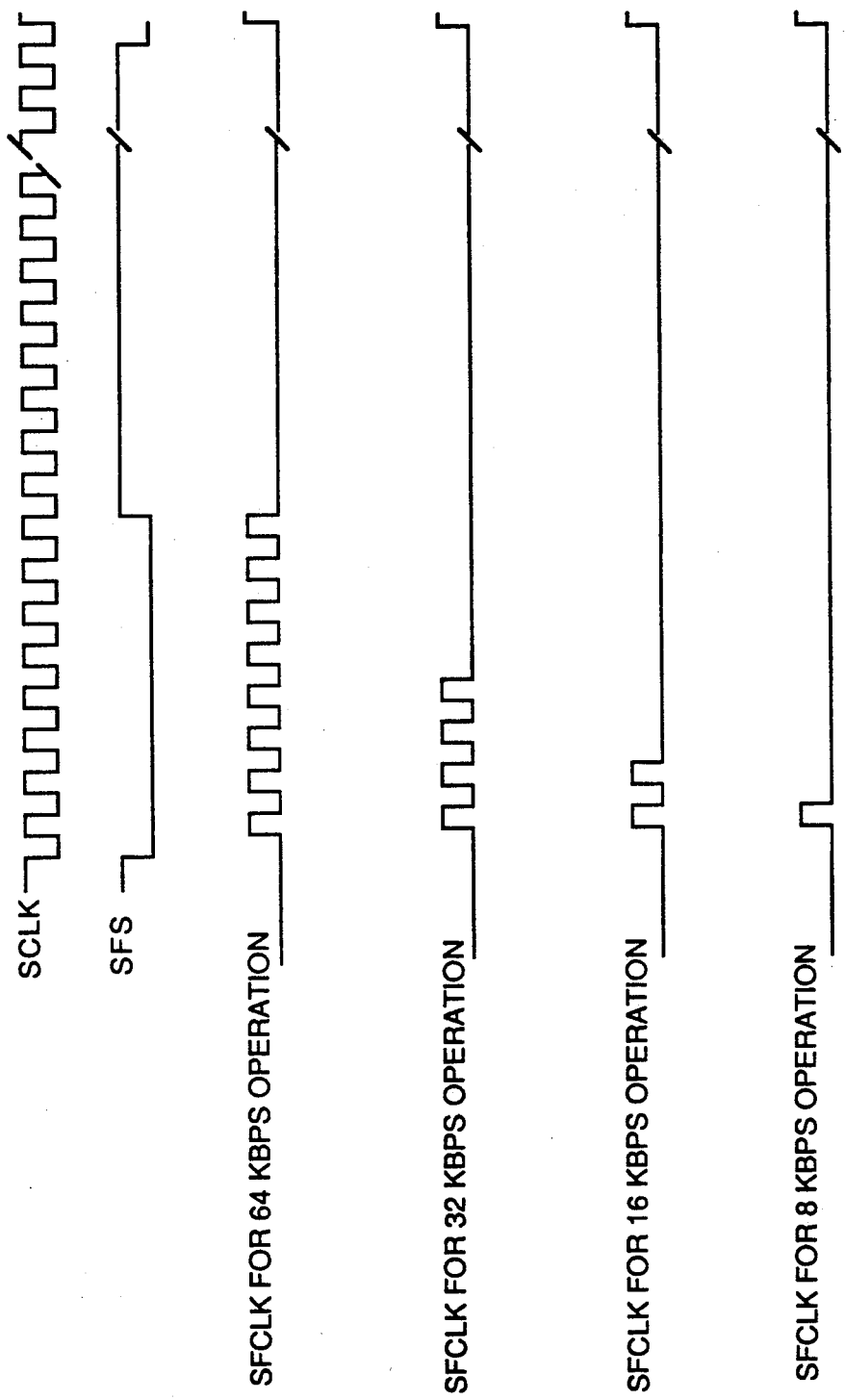
FIG. 10 shows a timing diagram for the generation of the RA2 data clock (SFCLK).
Figure 11A:
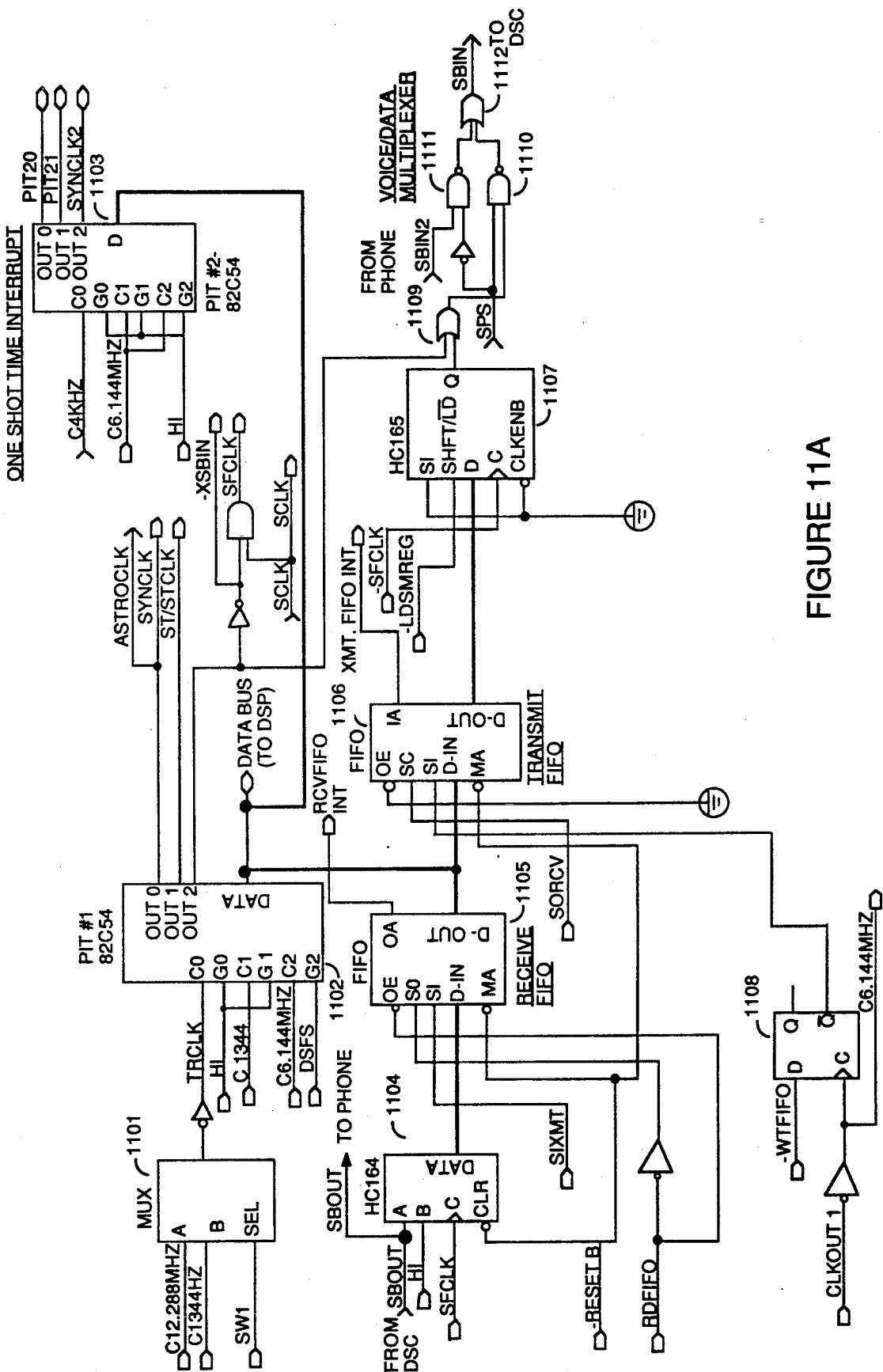
FIG. 11A is a schematic diagram of the Start/Stop bit circuitry.
Figure 11B:
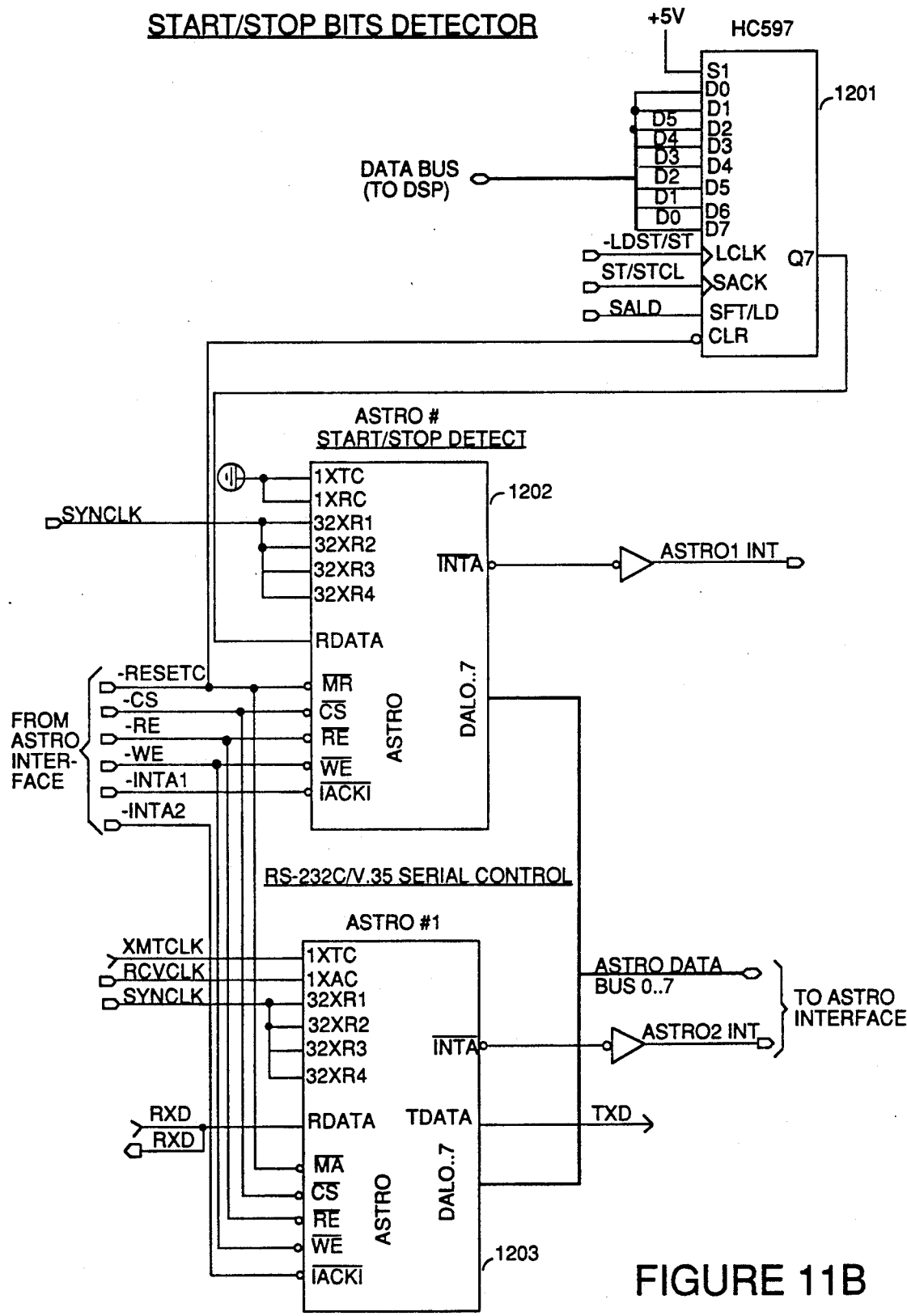
FIG. 11b is a schematic diagram of the Start/Stop bit circuitry.

Referring to FIG. 9 some of the messages transferred between the RA, MP, and the CO when a DA calls another DA are shown.

The originating RA detects an off-hook causing an ORIGINATE—A—CALL message to be sent to the MP. The MP then sends an ORIGINATE—A—CALL message to the CO indicating that the RA is originating a call. At the same time the MP blinks the CALL led indicating that a call is in progress. The CO tells the MP to COLLECT—DIGITS. As each digit is entered, it is sent from the RA to the MP; alternatively, if the digits are entered through the KEYPAD, the MP receives the digits directly. After the MP has collected all the digits, the MP sends them to the CO after which the CO send a STOP—DIGIT COLLECTION message. Assuming a valid number was dialed, the CO tells the MP that the terminating phone is ringing.

The CO then sends a INCOMING—CALL message to the terminating MP. The terminating MP then causes the DSC to generate ringing tone in the speaker, blink on the LED to indicate in-use, and wait for the RA to answer; alternatively, the operator can press the CONNECT button on the KEYPAD and the call will be answered. When the call is answered, the terminating RA sends an ANSWER message to the MP. The MP then sends ANSWER to the CO. Simultaneously, the MP sends to the RA a CONNECT—TO—LINE message, turns on the LED, and writes to the DSC to stop the ringing.

Figure 7:
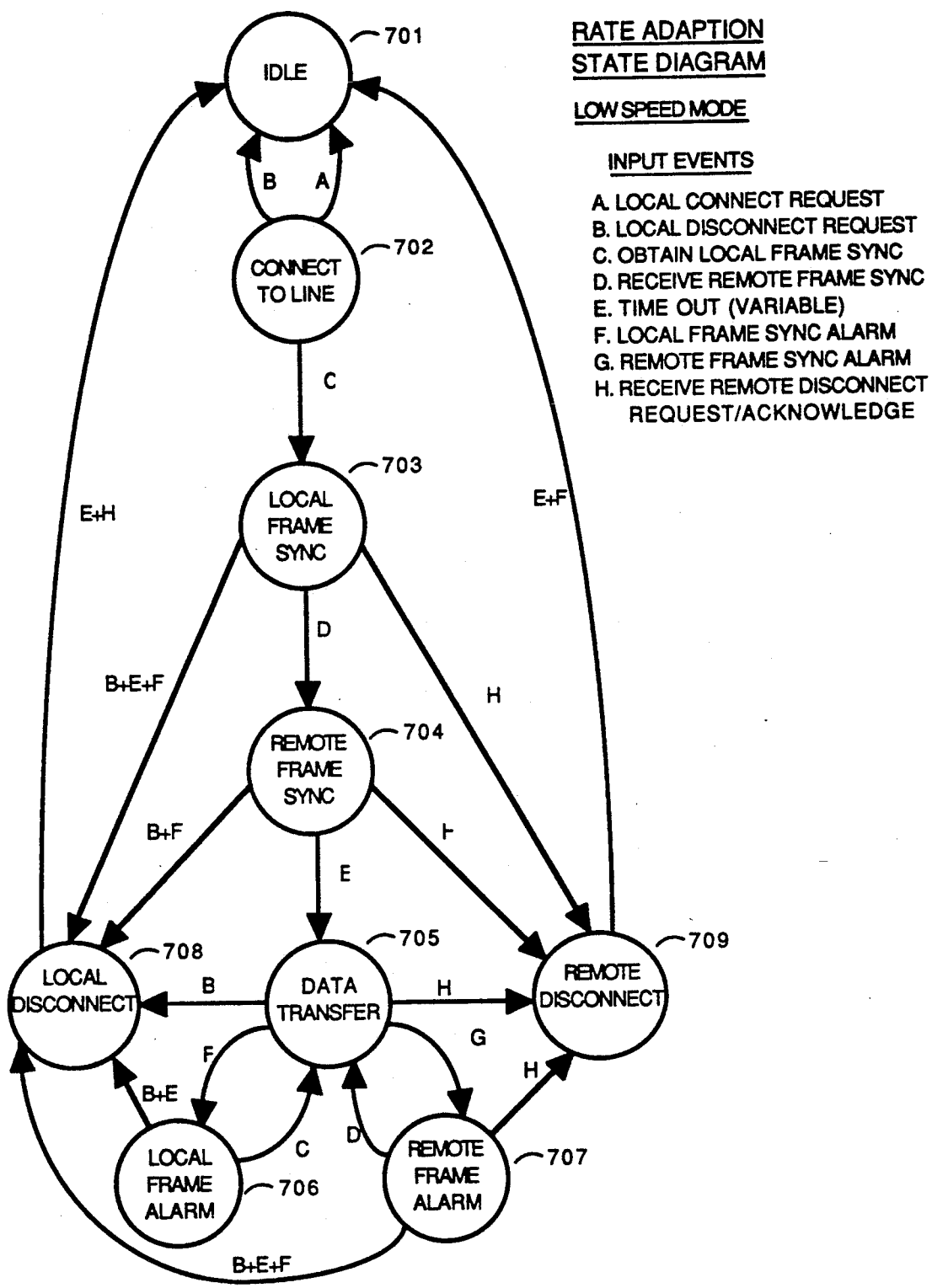
FIG. 7 is a state diagram of the rate adaption process for low speed.
Figure 8:
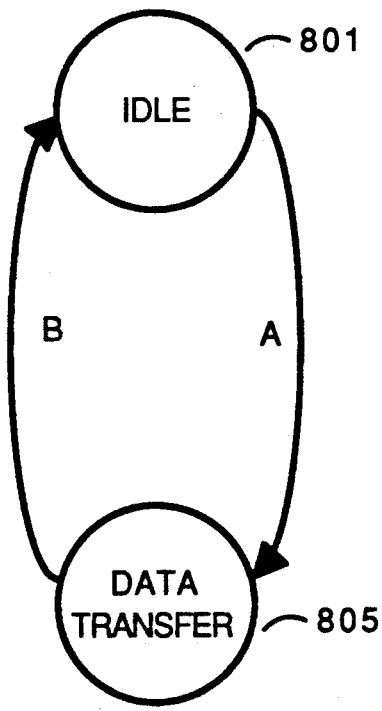
FIG. 8 is a state diagram of the rate adaption process for high speed.

Referring to FIGS. 7 and 8, prior to receiving the CONNECT—TO—LINE message, the RA was in state 1. When the RA receives the CONNECT—TO—LINE message it will change to either state 2 of FIG. 7 or state 5 of FIG. 8 depending on the selected data rate. Because the state diagram for the high speed is trivial, only the low speed diagram will be discussed. Once in state 2 the RA starts sending empty frames and looking for the FRAME—SYNC pattern (i.e. eight consecutive zeros) from the other end. Because the calling RA (the other end) has not yet received a CONNECT—TO—LINE message it is still in state 1 and is not sending frames yet. Referring back to FIG. 9, once the CO receives the ANSWER message, it sends DESTINATION—ANSWER to the originating MP. The MP then sends the RA a CONNECT—TO—LINE message, turns off the speaker, and turns on the CALL LED. When the RA receives the CONNECT—TO—LINE message it will change to state 2 of FIG. 7. Once in state 2 the RA starts sending empty frames and starts looking for the FRAME—SYNC pattern (i.e. eight consecutive zeros) from the other end. Because the called RA (the other end) is in state 2 and sending frames, the RA will eventually detect a FRAME—SYNC pattern. After the FRAME—SYNC pattern is detected, the RA changes to state 3 and sets the S and X-bits in the transmitted frames to signal the other side that it has received a valid frame. The called RA (the other end) will also eventually detect a FRAME—SYNC pattern and change to state 3, and setting the S and X-bits in its transmitted frames. State 4 is entered when the RA detects the S and X-bits set in the received frame. After at least 24 bits have been received in state 4, state 5 is entered. Once in state 5, both parties are connected and passing data and no further call processing is done until one party hangs up. The remainder of FIG. shows the hang-up call processing messages. Listed below are short definitions for each of the states shown in FIGS. 7 and 8:

IDLE (1): This is the No Operation state of the RA. It is only looking for a Local Connect Request. Otherwise it performs no operation.

CONNECT TO LINE (2): This state is only valid for low speed operation. In this state the RA is connected to the B-Channel and is searching for framing. It is transmitting valid framing to the other end with the S and X-bits OFF.

LOCAL FRAME SYNC (3): This state is only valid for low speed operation. In this state the RA has found valid framing from the other end and so signifies to the other end by turning ON the S and X-bits in the transmitted frame. It now waits for the other end to respond in the same way.

REMOTE FRAME SYNC (4): This state is only valid for low speed operation. In this state the RA has been told by the other end that it has obtained frame sync to the framing pattern being transmitted from this end. This RA will now wait at least 24 data bits and then proceed to the next state.

DATA TRANSFER (5): During this state, data is being rate adapted and transferred between the B-Channel and the terminal.

LOCAL FRAME ALARM (6): This state is only valid for low speed operation. This state is entered due to a loss of valid framing from the other end. The RA will attempt to resync to a framing pattern for three seconds. During this time it is transmitting all ones to the terminal, and a Remote Frame Alarm signal to the other end in the form of the S bit ON and the X bit OFF. If it fails to resync, it will time out and disconnect.

REMOTE FRAME ALARM (7): This state is only valid for low speed operation. This state is entered due to receiving a Remote Frame Alarm signal from the other end. This RA will start sending all ones in the data bit portion of the frame to assist the other end in resynchronizing. It will wait in this state for up to six seconds and then disconnect.

LOCAL DISCONNECT (8): This state is only valid for low speed operation. This state is the result of a Local Disconnect Request. It will start transmitting all zeros in the data bit portion of the frame and set the S bit to OFF and the X bit to ON. This tells the other end that this end requests to disconnect. It will then wait for the other end to acknowledge by responding with the same frame pattern, or no framing at all.

REMOTE DISCONNECT (9): This state is only valid for low speed operation. This state is the result of receiving a request to disconnect from the far end as detailed above. This RA will respond by setting the S bit to OFF and the X bit to ON. After a time out, it will revert to IDLE.

Although the preferred embodiment of the invention has been illustrated, and that form described, it is readily apparent to those skilled in the art that various modifications may be made therein without departing from the spirit of the invention or from the scope of the appended claims.

TABLE 2

Asynchronous Baud Rate Clock Frequencies

| DIVISOR | 32 × CLOCK | NOM. BAUD | MAX % OVERSPEED |
|---|---|---|---|
| 20 | 32 × 19200 | 19200 | 0.625 |
| 40 | 32 × 9600 | 9600 | 0.625 |
| 53 | 32 × 7245 | 7200 | 1.25 |
| 80 | 32 × 4800 | 4800 | 0.625 |
| 106 | 32 × 3623 | 3600 | 1.26 |
| 160 (159) | 32 × 2400 | 2400 | 1.25 |
| 320 (318) | 32 × 1200 | 1200 | 1.25 |
| 640 (636) | 32 × 600 | 600 | 1.25 |
| 1280 (1272) | 32 × 300 | 300 | 1.25 |
| 2560 (2544) | 32 × 150 | 150 | 1.25 |
| 3490 (3469) | 32 × 110 | 110 | 1.25 |
| 5120 (5088) | 32 × 75 | 75 | 1.25 |
| 7680 (7632) | 32 × 50 | 50 | 1.25 |

1) The input clock signal has a frequency of 12.288 MHz
2) The divisor in parenthesis indicates the suggested value to use for overspeed compensation. This, together with the shortened stop bits (and assuming an eight bit character with one start bit and one stop bit) provides the percent overspeed shown above. For other character sizes and number of stop bits, the percent overspeed will vary. For more overspeed, decrease the divisor futher.

TABLE 3

Ral Frame Structure

| Octet Number | Bit Position Number | | | | | | | |
|---|---|---|---|---|---|---|---|---|
| | One | Two | Three | Four | Five | Six | Seven | Eight |
| Zero | 0 | 0 | 0 | 0 | 0 | 0 | 0 | 0 |
| One | 1 | D1 | D2 | D3 | D4 | D5 | D6 | S1 |
| Two | 1 | D7 | D8 | D9 | D10 | D11 | D12 | X |
| Three | 1 | D13 | D14 | D15 | D16 | D17 | D18 | S3 |
| Four | 1 | D19 | D20 | D21 | D22 | D23 | D24 | S4 |
| Five | 1 | E1 | E2 | E3 | E4 | E5 | E6 | E7 |
| Six | 1 | D25 | D26 | D27 | D28 | D29 | D30 | S6 |
| Seven | 1 | D31 | D32 | D33 | D34 | D35 | D36 | X |
| Eight | 1 | D37 | D38 | D39 | D40 | D41 | D42 | S8 |
| Nine | 1 | D43 | D44 | D45 | D46 | D47 | D48 | S9 |

TABLE 4

600 bps to 8000 bps

| Octet Number | Bit Position Number | | | | | | | |
|---|---|---|---|---|---|---|---|---|
| | One | Two | Three | Four | Five | Six | Seven | Eight |
| Zero | 0 | 0 | 0 | 0 | 0 | 0 | 0 | 0 |
| One | 1 | D1 | D1 | D1 | D1 | D1 | D1 | S1 |
| Two | 1 | D1 | D1 | D2 | D2 | D2 | D2 | X |
| Three | 1 | D2 | D2 | D2 | D2 | D3 | D3 | S3 |
| Four | 1 | D3 | D3 | D3 | D3 | D3 | D3 | S4 |
| Five | 1 | 1 | 0 | 0 | E4 | E5 | E6 | M |
| Six | 1 | D4 | D4 | D4 | D4 | D4 | D4 | S6 |
| Seven | 1 | D4 | D4 | D5 | D5 | D5 | D5 | X |
| Eight | 1 | D5 | D5 | D5 | D5 | D6 | D6 | S8 |
| Nine | 1 | D6 | D6 | D6 | D6 | D6 | D6 | S9 |

TABLE 5

1200 bps to 8000 bps

| Octet Number | Bit Position Number | | | | | | | |
|---|---|---|---|---|---|---|---|---|
| | One | Two | Three | Four | Five | Six | Seven | Eight |
| Zero | 0 | 0 | 0 | 0 | 0 | 0 | 0 | 0 |
| One | 1 | D1 | D1 | D1 | D1 | D2 | D2 | S1 |
| Two | 1 | D2 | D2 | D3 | D3 | D3 | D3 | X |
| Three | 1 | D4 | D4 | D4 | D4 | D5 | D5 | S3 |
| Four | 1 | D5 | D5 | D6 | D6 | D6 | D6 | S4 |
| Five | 1 | 0 | 1 | 0 | E4 | E5 | E6 | 1 |
| Six | 1 | D7 | D7 | D7 | D7 | D8 | D8 | S6 |
| Seven | 1 | D8 | D8 | D9 | D9 | D9 | D9 | X |
| Eight | 1 | D10 | D10 | D10 | D10 | D11 | D11 | S8 |
| Nine | 1 | D11 | D11 | D12 | D12 | D12 | D12 | S9 |

TABLE 6

2400 bps to 8000 bps

| Octet Number | Bit Position Number | | | | | | | |
|---|---|---|---|---|---|---|---|---|
| | One | Two | Three | Four | Five | Six | Seven | Eight |
| Zero | 0 | 0 | 0 | 0 | 0 | 0 | 0 | 0 |
| One | 1 | D1 | D1 | D2 | D2 | D3 | D3 | S1 |
| Two | 1 | D4 | D4 | D5 | D5 | D6 | D6 | X |
| Three | 1 | D7 | D7 | D8 | D8 | D9 | D9 | S3 |
| Four | 1 | D10 | D10 | D11 | D11 | D12 | D12 | S4 |
| Five | 1 | 1 | 1 | 0 | E4 | E5 | E6 | 1 |
| Six | 1 | D13 | D13 | D14 | D14 | D15 | D15 | S6 |
| Seven | 1 | D16 | D16 | D17 | D17 | D18 | D18 | X |
| Eight | 1 | D19 | D19 | D20 | D20 | D21 | D21 | S8 |
| Nine | 1 | D22 | D22 | D23 | D23 | D24 | D24 | S9 |

TABLE 7

7200 bps to 16000 bps
14400 bps to 32000 bps

| Octet Number | Bit Position Number | | | | | | | |
|---|---|---|---|---|---|---|---|---|
| | One | Two | Three | Four | Five | Six | Seven | Eight |
| Zero | 0 | 0 | 0 | 0 | 0 | 0 | 0 | 0 |

TABLE 7-continued

7200 bps to 16000 bps
14400 bps to 32000 bps

| Octet Number | Bit Position Number | | | | | | | |
|---|---|---|---|---|---|---|---|---|
| | One | Two | Three | Four | Five | Six | Seven | Eight |
| One | 1 | D1 | D2 | D3 | D4 | D5 | D6 | S1 |
| Two | 1 | D7 | D8 | D9 | D10 | F | F | X |
| Three | 1 | D11 | D12 | F | F | D13 | D14 | S3 |
| Four | 1 | F | F | D15 | D16 | D17 | D18 | S4 |
| Five | 1 | 1 | 0 | 1 | E4 | E5 | E6 | 1 |
| Six | 1 | D19 | D20 | D21 | D22 | D23 | D24 | S6 |
| Seven | 1 | D25 | D26 | D27 | D28 | F | F | X |
| Eight | 1 | D29 | D30 | F | F | D31 | D32 | S8 |
| Nine | 1 | F | F | D33 | D34 | D35 | D36 | S9 |

TABLE 8

4800 bps to 8000 bps
9600 bps to 16000 pbs
19200 bps to 32000 bps

| Octet Number | Bit Position Number | | | | | | | |
|---|---|---|---|---|---|---|---|---|
| | One | Two | Three | Four | Five | Six | Seven | Eight |
| Zero | 0 | 0 | 0 | 0 | 0 | 0 | 0 | 0 |
| One | 1 | D1 | D2 | D3 | D4 | D5 | D6 | S1 |
| Two | 1 | D7 | D8 | D9 | D10 | D11 | D12 | X |
| Three | 1 | D13 | D14 | D15 | D16 | D17 | D18 | S3 |
| Four | 1 | D19 | D20 | D21 | D22 | D23 | D24 | S4 |
| Five | 1 | 0 | 1 | 1 | E4 | E5 | E6 | 1 |
| Six | 1 | D25 | D26 | D27 | D28 | D29 | D30 | S6 |
| Seven | 1 | D31 | D32 | D33 | D34 | D35 | D36 | X |
| Eight | 1 | D37 | D38 | D39 | D40 | D41 | D42 | S8 |
| Nine | 1 | D43 | D44 | D45 | D46 | D47 | D48 | S9 |

TABLE 9

Frame Structure
Direct Adapation of 56 Kbps to 64 Kbps

| Octet Number | Bit Position Number | | | | | | | |
|---|---|---|---|---|---|---|---|---|
| | One | Two | Three | Four | Five | Six | Seven | Eight |
| One | D1 | D2 | D3 | D4 | D5 | D6 | D7 | 1 |
| Two | D8 | D9 | D10 | D11 | D12 | D13 | D14 | 1 |
| Three | D15 | F16 | F17 | D18 | D19 | D20 | D21 | 1 |
| Four | D22 | D23 | D24 | D25 | D26 | D27 | D28 | 1 |
| Five | D29 | D30 | D31 | D32 | D33 | D34 | D35 | 1 |
| Six | D36 | D37 | D38 | D39 | D40 | D41 | D42 | 1 |
| Seven | D43 | D44 | D45 | D46 | D47 | D48 | D49 | 1 |
| Eight | D50 | D51 | D52 | D53 | D54 | D55 | D56 | 1 |

TABLE 10

Frame Structure Direct Adapation of 48 Kbps to 64 Kbps

| Octet Number | Bit Position Number | | | | | | | |
|---|---|---|---|---|---|---|---|---|
| | One | Two | Three | Four | Five | Six | Seven | Eight |
| One | 1 | D1 | D2 | D3 | D4 | D5 | D6 | S1 |
| Two | 0 | D7 | D8 | D9 | D10 | D11 | D12 | X |
| Three | 1 | D13 | D14 | D15 | D16 | D17 | D18 | S3 |
| Four | 1 | D19 | D20 | D21 | D22 | D23 | D24 | S4 |

1) Because there is no guarantee of having a 64 Kbps clear Channel, the S and X bits above will always be set to a 1.

TABLE 11

Frame Structure Direct Adapation of 64 Kbps to 64 Kbps

| Octet Number | Bit Position Number | | | | | | | |
|---|---|---|---|---|---|---|---|---|
| | One | Two | Three | Four | Five | Six | Seven | Eight |
| One | D1 | D2 | D3 | D4 | D5 | D6 | D7 | D8 |

TABLE 12

E-Bit Usage vs. User Data Rate

| Intermediate Rates Kbps | | | E-Bits | | | | | | |
|---|---|---|---|---|---|---|---|---|---|
| 8 bps | 16 bps | 32 bps | E1 | E2 | E3 | E4 | E5 | E6 | E7 |
| 600 | | | 1 | 0 | 0 | C | C | C | M |
| 1200 | | | 0 | 1 | 0 | C | C | C | 1 |
| 2400 | | | 1 | 1 | 0 | C | C | C | 1 |
| | 7200 | 14400 | 1 | 0 | 1 | C | C | C | 1 |
| 4800 | 9600 | 19200 | 0 | 1 | 1 | C | C | C | 1 |

1) The M bit is used for multiframe synchronization as recommended by CCITT I.460.
2) The C bits transport the Network Independent Clocking information.

TABLE 13

Interchange Circuit Mapping Scheme

| Interchange Circuit at Transmitter | Control Bits | Interchange Circuit at Receiver |
|---|---|---|
| 108 | S1, S3, S6, S8 (=SA) | 107 |
| 105 | S4, S9 (=SB) | 109 |
| Frame Sync | X | 106 |

What is claimed is:

1. A data adapter for simultaneously providing a low speed channel, a first high speed channel, and a second high speed channel over a two wire connection, said two wire connection connects said data adapter to a telephone system, said data adapter comprising:

a line transceiver means connected to said two-wire connection, said line transceiver means provides a full duplex transmission link with said telephone system over said two-wire connection, said full duplex transmission link comprised of said low speed channel, said first high speed channel, and said second high speed channel;

a protocol controller means connected to said line transceiver means, said protocol controller means performs a packet protocol on said low speed channel and, said protocol controller means routes said first high speed channel to a telephone interface means and said second high speed channel to a rate adapter means;

said telephone interface means connected to said protocol controller means, said telephone interface means converts data between said first high speed channel and a telephone instrument;

said rate adapter means connected to said protocol controller means, said rate adapter means converts data between said second high speed channel and a data processing equipment, said rate adapter means performs a rate adaption protocol while converting said data between said second high speed channel and said data processing equipment, said rate adapter means including a signal processor means arranged to perform said rate adaption protocol; and a processor means connected to said line transceiver means, said protocol controller means, said telephone interface means, and said rate adapter means, said processor means arranged to receive and transmit messages through said protocol controller means over said low speed channel to said telephone system, and in response to information received over said low speed channel, and information received from said rate adapter means, said processor means controls said data adapter.

2. A data adapter as claimed in claim 1, said data adapter further comprising:

a tone generator means connected to said protocol controller means, said tone generator means creates sounds used to convey information; and a speaker arranged to make said sounds from said tone generator means audible.

3. A data adapter as claimed in claim 1, said data adapter further comprising:

a display means connected to said processor means, said display means arranged to convey visual information;

a keyboard means connected to said processor means, said keyboard means arranged to allow information to be entered.

4. A data adapter for simultaneously providing a low speed channel, a first high speed channel, and a second high speed channel over a two wire connection, said two wire connection connects said data adapter to a telephone system, said data adapter comprising:

a line transceiver means connected to said two-wire connection, said line transceiver means provides a full duplex transmission link with said telephone system over said two-wire connection, said full duplex transmission link comprised of said low speed channel, said first high speed channel, and said second high speed channel;

a protocol controller means connected to said line transceiver means, said protocol controller means performs a packet protocol on said low speed channel and, said protocol controller means routes said first high speed channel to a telephone interface means and said second high speed channel to a rate adapter means;

said telephone interface means connected to said protocol controller means, said telephone interface means converts data between said first high speed channel and a telephone instrument;

said rate adapter means connected to said protocol controller means, said rate adapter means converts data between said second high speed channel and a data processing equipment, said rate adapter means performs a rate adaption protocol while converting said data between said second high speed channel and said data processing equipment, said rate adapter means including a signal processor means arranged to perform said rate adaption protocol, said rate adapter means including a Read Only Memory (ROM) means for storing a rate adaption protocol program used by said signal processor means, and a Random Access Memory means used by said signal processor means for temporary storage; and a processor means connected to said line transceiver means, said protocol controller means, said telephone interface means, and said rate adapter means, said processor means arranged to receive and transmit messages through said protocol controller means over said low speed channel to said telephone system, and in response to information received over said low speed channel, and information received from said rate adapter means, said processor means controls said data adapter.

5. A data adapter as claimed in claim 4, said rate adapter means further comprising:

a first serial transceiver means connected between said signal processor means and said data processing equipment, said first serial transceiver means converts data between said signal processor means and said data processing equipment;

a parallel to serial converter means connected to said signal processor means, said parallel to serial converter means accepts parallel data from said signal processor means and converts said parallel data to serial data; and a second serial transceiver means connected between said signal processor means and said parallel to serial converter means, said second serial transceiver means arranged to receive said serial data and extract a complete data byte from said serial data, said complete data byte is then converted to a parallel format and transmitted to said signal processor.

6. A data adapter as claimed in claim 4, said rate adapter means further comprising an interchange circuit means connected to said signal processor means, said interchange circuit means monitors a first plurality of signals between said data adapter and said data processing equipment and generates a second plurality of signals between said data adapter and said data processing equipment, where said first plurality of signals and said second plurality of signals indicate whether data can be exchanged between said data adapter and said data processing equipment.

7. A data adapter as claimed in claim 4, said rate adapter means further comprising:

a transmit First-In-First-Out (FIFO) means arranged to transmit data from said signal processor means over said second high speed channel; and a receive FIFO means arranged to receive data from said second high speed channel and send said received data to said signal processor means.

8. A data adapter as claimed in claim 4, said telephone interface means further comprising:

a combo means for converting a received analog signal to a transmitted digital signal, and converting a received digital signal to a transmitted analog signal, said combo means receives said received analog signal and transmits said transmitted analog signal to said telephone instrument, said combo means is further arranged to communicate with said processor means;

a Dual Tone Multi-Frequency (DTMF) receiver for detecting and decoding a received pair of tones, said DTMF received receives said pair of tones from said telephone instrument and transmits said decoding to said processor means;

a serial-to-serial converter means for converting said transmitted digital signal to said first high speed channel and converting said first high speed channel to said received digital signal; and a clock generator means for generating a plurality of signals used by said serial-to-serial converter means.

9. A data adapter for simultaneously providing a low speed channel, a first high speed channel, and a second high speed channel over a two wire connection, said two wire connection connects said data adapter to a telephone system, said first high speed channel carries a digitized analog signal from, and to, a telephone instrument and said second high speed channel carries data from, and to, a data processing equipment, said data adapter comprising:

a line transceiver means connected to said two-wire connection, said line transceiver means provides a full duplex transmission link with said telephone system over said two-wire connection, said full duplex transmission link comprised of said low speed channel, said first high speed channel, and said second high speed channel;

a control interface means connected to said line transceiver means, said control interface means arranged to provide a communications channel to said line transceiver;

a protocol controller means connected to said line transceiver means, said protocol controller means performs a packet protocol on said low speed channel and, said protocol controller means routes said first high speed channel to a telephone interface means and said second high speed channel to a signal processor means;

said telephone interface means connected to said protocol controller means, said telephone interface means converts data between said first high speed channel and said telephone instrument;

said signal processor means connected to said protocol controller means, said signal processor means arranged to perform a rate adaption protocol on said second high speed channel and said data from, and to, said data processing equipment;

a first serial transceiver means connected between said signal processor means and said data processing equipment, said first serial transceiver means converts data between said signal processor means and said data processing equipment;

a parallel to serial converter means connected to said signal processor means, said parallel to serial converter means accepts parallel data from said signal processor means and converts said parallel data to serial data;

a second serial transceiver means connected between said signal processor means and said parallel to serial converter means, said second serial transceiver means arranged to receive said serial data and extract a complete data byte from said serial data, said complete data byte is then converted to a parallel format and transmitted to said signal processor;

an interprocessor interface means connected to said signal processor means, said interprocessor interface means arranged to provide a communication channel to said signal processor means; and a processor means connected to said control interface means, said protocol controller means, said telephone interface means, and said interprocessor interface means, said processor means arranged to receive and transmit messages through said protocol controller means over said low speed channel to said telephone system, and in response to information received over said low speed channel, and information received from said signal processor means through said interprocessor means, said processor means controls said data adapter, said processor means controls said line transceiver means through said control interface means.

10. A data adapter as claimed in claim 9, said data adapter further comprising:

a tone generator means connected to said protocol controller means, said tone generator means creates sounds used to convey information; and a speaker arranged to make said sounds from said tone generator means audible.

11. A data adapter as claimed in claim 9, said data adapter further comprising:

a display means connected to said processor means, said display means arranged to convey visual information;

a keyboard means connected to said processor means, said keyboard means arranged to allow information to be

12. A data adapter as claimed in claim 9, said data adapter further comprising:

a transmit First-In-First-Out (FIFO) means arranged to transmit data from said signal processor means over said second high speed channel; and a receive FIFO means arranged to receive data from said second high speed channel and send said received data to said signal processor means.

13. A data adapter as claimed in claim 9, said telephone interface means further comprising:

a combo means for converting a received analog signal to a transmitted digital signal, and converting a received digital signal to a transmitted analog signal, said combo means receives said received analog signal and transmits said transmitted analog signal to said telephone instrument, said combo means is further arranged to communicate with said processor means;

a Dual Tone Multi-Frequency (DTMF) receiver for detecting and decoding a received pair of tones, said DTMF receiver receives said pair of tones from said telephone instrument and transmits said decoding to said processor means;

a serial-to-serial converter means for converting said transmitted digital signal to said digitized analog signal and converting said digitized analog signal to said received digital signal; and a clock generator means for generating a plurality of signals used by said serial-to-serial converter means.

* * * * *